US012798919B2

(12) United States Patent
Hirata et al.

(10) Patent No.: US 12,798,919 B2
(45) Date of Patent: Nov. 17, 2026

(54) MEDIA PROCESSING APPARATUS, IMAGE FORMING APPARATUS, AND IMAGE FORMING SYSTEM

(71) Applicants: Satoshi Hirata, Kanagawa (JP); Yuusuke Shibasaki, Kanagawa (JP); Yusuke Hirono, Kanagawa (JP); Atsushi Shinoda, Kanagawa (JP); Shuuto Tohkaishi, Kanagawa (JP); Shingo Yoshizawa, Kanagawa (JP); Suzuka Fujita, Kanagawa (JP); Naofumi Yoshida, Kanagawa (JP); Ryota Takayama, Kanagawa (JP); Takahiro Watanabe, Kanagawa (JP); Takuya Morinaga, Kanagawa (JP); Yuji Suzuki, Kanagawa (JP); Kanako Fujisaki, Kanagawa (JP); Jun Yamada, Kanagawa (JP); Wataru Nozaki, Kanagawa (JP)

(72) Inventors: Satoshi Hirata, Kanagawa (JP); Yuusuke Shibasaki, Kanagawa (JP); Yusuke Hirono, Kanagawa (JP); Atsushi Shinoda, Kanagawa (JP); Shuuto Tohkaishi, Kanagawa (JP); Shingo Yoshizawa, Kanagawa (JP); Suzuka Fujita, Kanagawa (JP); Naofumi Yoshida, Kanagawa (JP); Ryota Takayama, Kanagawa (JP); Takahiro Watanabe, Kanagawa (JP); Takuya Morinaga, Kanagawa (JP); Yuji Suzuki, Kanagawa (JP); Kanako Fujisaki, Kanagawa (JP); Jun Yamada, Kanagawa (JP); Wataru Nozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 18/779,598

(22) Filed: Jul. 22, 2024

(65) Prior Publication Data

US 2025/0033919 A1 Jan. 30, 2025

(30) Foreign Application Priority Data

Jul. 27, 2023 (JP) ................................ 2023-122495

(51) Int. Cl.
*B65H 37/04* (2006.01)
*B65H 43/00* (2006.01)
*G03G 15/00* (2006.01)

(52) U.S. Cl.
CPC ............ *B65H 37/04* (2013.01); *B65H 43/00* (2013.01); *G03G 15/6544* (2013.01);
(Continued)

(58) Field of Classification Search
CPC .......... B31F 5/02; B31F 1/36; B31F 2201/07; B31F 2201/0779; B31F 2201/0784;
(Continued)

(56) References Cited

U.S. PATENT DOCUMENTS 7,920,820 B2 * 4/2011 Kitta ...................... B42C 11/02 412/37
8,495,821 B2 * 7/2013 Wang ...................... G01B 5/06 33/549
(Continued)

FOREIGN PATENT DOCUMENTS

JP 2004209859 A * 7/2004 .......... B42C 9/0081
JP 2005-096392 A 4/2005
(Continued)

*Primary Examiner* — Leslie A Nicholson, III
(74) *Attorney, Agent, or Firm* — IPUSA, PLLC

(57) ABSTRACT

A media processing apparatus includes a slit insertable a sheet bundle of multiple sheets, a sheet-bundle holder, a liquid applier, a press binder, and a controller. The sheet-
(Continued)

bundle holder holds the sheet bundle and detects the thickness of the sheet bundle. The liquid applier applies liquid to the sheet bundle. The press binder presses and binds the sheet bundle to perform press-binding process. The controller causes the sheet-bundle holder to hold the sheet bundle and detect the thickness of the sheet bundle, determines whether to cause the liquid applier to apply liquid to the sheet bundle based on the thickness of the sheet bundle, causes the liquid applier to apply the liquid to the sheet bundle when it is determined that the thickness of the sheet bundle is equal or larger than a prescribed thickness, and causes the press binder to press and bind the sheet bundle.

12 Claims, 17 Drawing Sheets

(52) U.S. Cl.
CPC ................ *B65H 2301/5161* (2013.01); *B65H 2301/5162* (2013.01); *B65H 2511/15* (2013.01)

(58) Field of Classification Search
CPC ..... G03G 15/6544; G03G 2215/00856; G03G 2215/0086; G03G 2215/00864; G03G 2215/00852; G03G 2215/00848; B65H 37/04; B65H 43/00; B65H 2511/15; B65H 2301/5161; B65H 2301/5162; B65H 2301/43828; B65H 2301/5142
USPC ............................................ 270/58.08, 58.09
See application file for complete search history.

(56) References Cited

U.S. PATENT DOCUMENTS

| | | | | |
|---|---|---|---|---|
| 10,654,240 | B2 * | 5/2020 | Takahashi | B65H 37/04 |
| 11,383,951 | B2 * | 7/2022 | Kawakami | B41J 11/58 |
| 11,396,438 | B2 * | 7/2022 | Ueno | B65H 29/48 |
| 2013/0270763 | A1 | 10/2013 | Furuhashi et al. | |
| 2015/0123342 | A1 | 5/2015 | Furuhashi et al. | |
| 2015/0360899 | A1 | 12/2015 | Takahashi et al. | |
| 2016/0340144 | A1 | 11/2016 | Sakano et al. | |
| 2016/0340145 | A1 | 11/2016 | Kunieda et al. | |
| 2016/0360053 | A1 | 12/2016 | Suzuki et al. | |
| 2017/0305706 | A1 | 10/2017 | Takahashi et al. | |
| 2020/0140222 | A1 | 5/2020 | Takahashi et al. | |
| 2020/0307944 | A1 | 10/2020 | Shibasaki et al. | |

FOREIGN PATENT DOCUMENTS

| | | | |
|---|---|---|---|
| JP | 2013-126911 | A | 6/2013 |
| JP | 2014-201432 | A | 10/2014 |
| JP | 2015-016970 | A | 1/2015 |
| JP | 2015-166281 | A | 9/2015 |
| JP | 2016-016973 | A | 2/2016 |
| JP | 2017-019592 | A | 1/2017 |
| JP | 2018-199553 | A | 12/2018 |
| JP | 2019-034797 | A | 3/2019 |
| JP | 2020-055207 | A | 4/2020 |

* cited by examiner

T400

| | DETECTED NUMBER OF SHEETS | | |
|---|---|---|---|
| | 1-5 | 6-19 | 20 OR LARGER |
| PRESS BINDING | ✓ | ✓ | × |
| LIQUID APPLICATION | × | ✓ | × |

MEDIA PROCESSING APPARATUS, IMAGE FORMING APPARATUS, AND IMAGE FORMING SYSTEM

CROSS-REFERENCE TO RELATED APPLICATIONS

This patent application is based on and claims priority pursuant to 35 U.S.C. § 119(a) to Japanese Patent Application No. 2023-122495, filed on Jul. 27, 2023, in the Japan Patent Office, the entire disclosure of which is hereby incorporated by reference herein.

BACKGROUND

Technical Field

Embodiments of the present disclosure relate to a media processing apparatus, an image forming apparatus, and an image forming system.

Related Art

A media processing apparatus is known that performs a predetermined process on a sheet-shaped medium as a target object. An image forming apparatus is also known that forms an image on a sheet-shaped medium includes a functional unit, which serves as a media processing apparatus, in a housing of the image forming apparatus. Still, an image forming system is also known that includes a media processing apparatus and an image forming apparatus in which the media processing apparatus is installed on a lateral side of the image forming apparatus and coupled to the image forming apparatus.

In such media processing apparatus, multiple types of predetermined sheet processing can be performed. For example, a binding process of binding multiple sheets as media and a punching process of punching holes in multiple sheets are known.

As the binding process, staple binding process for binding a sheet bundle using a binding staple and a press-binding process for binding a sheet bundle by pressure bonding by deforming a part of the sheet bundle under pressure without using a binding member such as a binding staple are known. In addition to online binding in which the ends of sheets on which images have been formed are aligned and the aligned ends are bound and ejected as a sheet bundle, offline binding in which sheets on which images have been formed are ejected to an output tray and a binding process is manually performed by bundling the ejected sheets is also known.

A media processing apparatus is also known that detects a sheet bundle inserted into an opening of the media processing apparatus and holds the sheet bundle when the offline binding is performed.

SUMMARY

In an embodiment of the present disclosure, a media processing apparatus includes a slit insertable a sheet bundle of multiple sheets, a sheet-bundle holder, a liquid applier, a press binder, and a controller. The sheet-bundle holder holds the sheet bundle inserted into the slit and detects the thickness of the sheet bundle in a thickness direction. The liquid applier applies liquid to the sheet bundle. The press binder presses and binds the sheet bundle inserted into the slit to perform press-binding process. The controller causes the sheet-bundle holder to hold the sheet bundle inserted into the slit and detect the thickness of the sheet bundle in the thickness direction, determines whether to cause the liquid applier to apply liquid to the sheet bundle based on the thickness of the sheet bundle detected by the sheet-bundle holder, cause the liquid applier to apply the liquid to the sheet bundle when it is determined that the thickness of the sheet bundle is equal or larger than a prescribed thickness, and cause the press binder to press and bind the sheet bundle inserted into the slit.

In another embodiment of the present disclosure, an image forming apparatus includes a housing, the media processing apparatus detachably attachable to the housing, and an image forming device in the housing to form an image on the multiple sheets. The media processing apparatus presses and binds the sheet bundle of the multiple sheets on which the image has been formed by the image forming apparatus.

In still another embodiment of the present disclosure, an image forming system includes the media processing apparatus and an image forming apparatus to form an image on each of the multiple sheets. The media processing apparatus presses and binds the sheet bundle of the multiple sheets on which the image has been formed by the image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
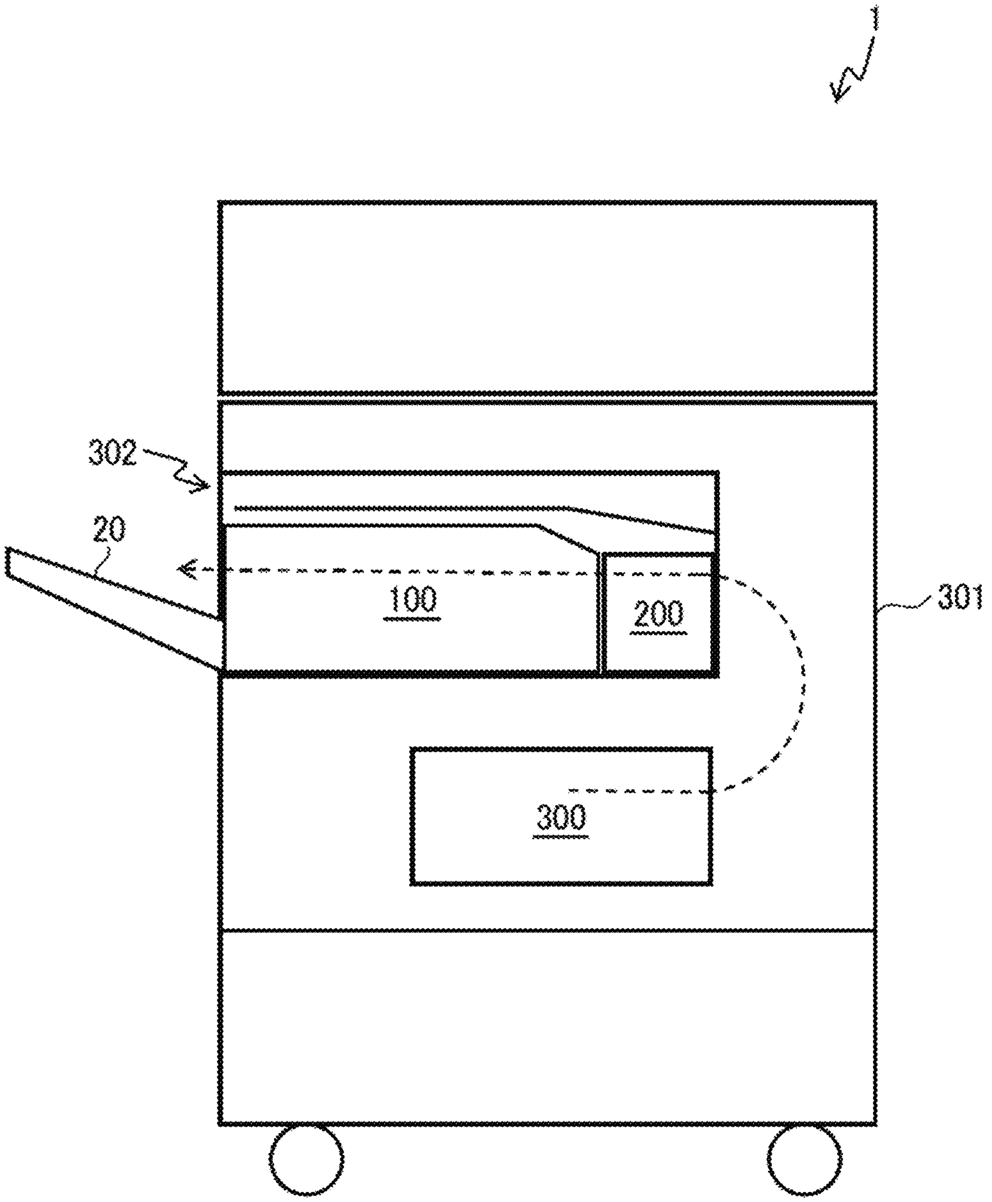
FIG. 1 is a diagram illustrating a schematic configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of a media processing apparatus, an image forming apparatus, and an image forming system according to embodiments of the present disclosure with reference to the drawings.

Embodiment of Image Forming Apparatus

First, an embodiment of an image forming apparatus according to the present disclosure is described. FIG. 1 is a diagram illustrating a schematic configuration of an image forming apparatus 1 according to an embodiment. The image forming apparatus 1 has an image forming function to form an image on a sheet P as an example of a sheet-shaped medium and a post-processing function to perform predetermined sheet processing, i.e., post processing on the sheet P on which the image is recorded.

As illustrated in FIG. 1, the image forming apparatus 1 typically includes a housing 301 and an image forming device 300 as an image forming device inside the housing 301. The housing 301 has a box shape in which an internal space is formed to accommodate components of the image forming apparatus 1. The housing 301 includes an in-body space 302 accessible from the outside of the image forming apparatus 1. A portion of the housing 301 is cut out such that the in-body space 302 is exposed to the outside of the image forming apparatus 1. For example, the in-body space 302 is positioned slightly above the center of the housing 301 in the vertical direction.

A punching unit 200 that performs punching processing and a binding device 100 that performs a binding process to bind a sheet bundle Pb as a sheet bundle in which multiple sheets P are bundled can be attached inside the in-body space 302 as optional units for adding optional functions. The binding device 100 serves as a media processing apparatus according to embodiments of the present disclosure.

The image forming device 300 ejects a sheet P picked up and conveyed from a sheet tray to the punching unit 200 and the binding device 100. The image forming device 300 may be an inkjet device that forms an image using ink or an electrophotographic device that forms an image using toner. The configuration of the image forming device 300 is known. For this reason, detailed description of the image forming device 300 is omitted.

The punching unit 200 is attached to the in-body space 302 of the image forming apparatus 1 at a position downstream from the image forming device 300 and upstream from the binding device 100 in a sheet conveyance direction along a conveyance path, i.e., a path indicated by a dashed arrow in FIG. 1, of the sheet P from the image forming device 300 to the binding device 100 in a sheet conveyance direction. In other words, in the image forming apparatus 1, the sheet P on which an image is formed by the image forming device 300 is first delivered to the punching unit 200, and a predetermined punch-hole forming process is performed. Subsequently, the sheet P is delivered to the binding device 100, and a binding process to be described below is performed.

Figure 2:
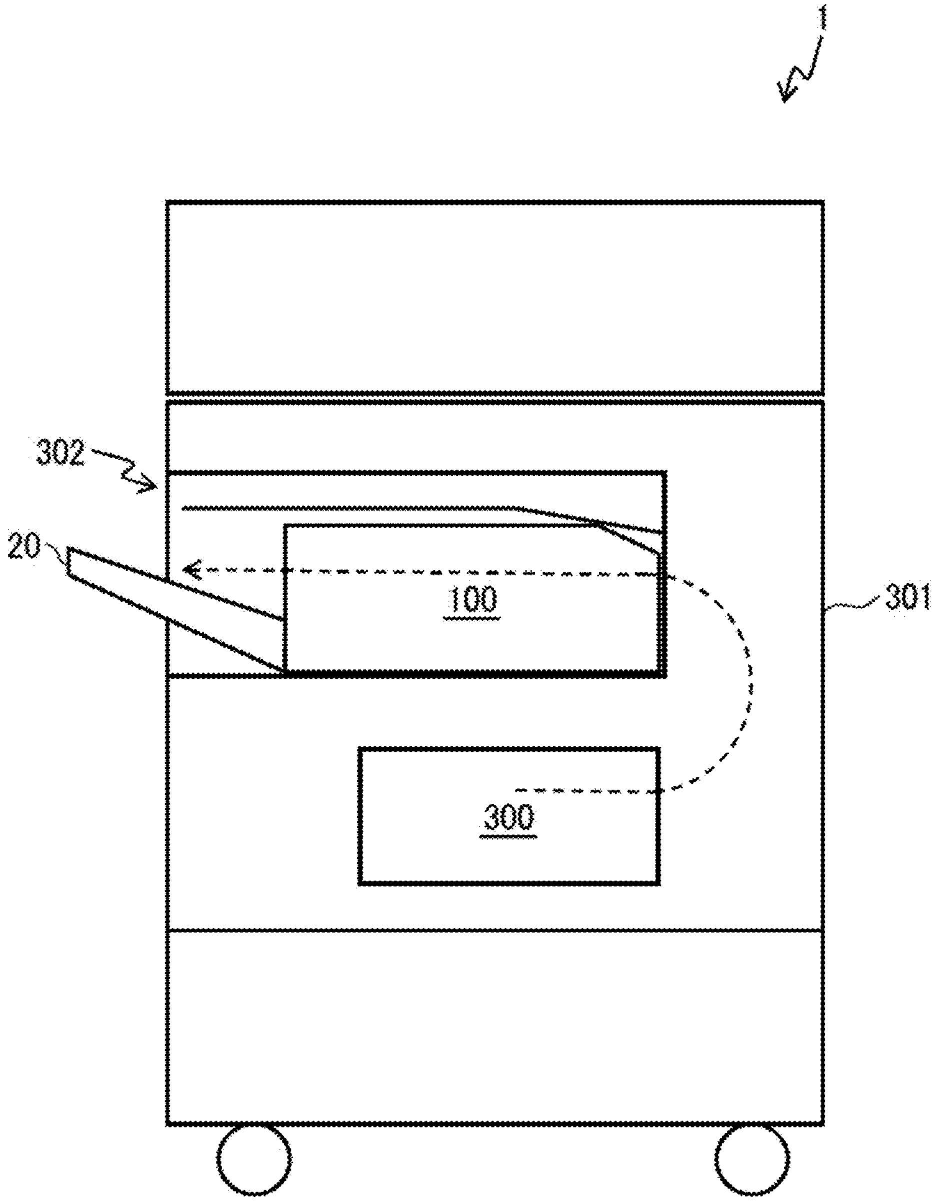
FIG. 2 is a schematic diagram illustrating the image forming apparatus of FIG. 1 when a punching unit is detached from the image forming apparatus.

The punching unit 200 is detachable from the image forming apparatus 1. FIG. 2 is a schematic diagram illustrating the image forming apparatus 1 when the punching unit 200 is detached from the image forming apparatus 1. In this case, the sheet P on which an image has been formed by the image forming device 300 is directly delivered to the binding device 100 and subjected to the binding process. Another processing unit that performs given processing on a sheet P can be attached to a position in the in-body space 302 from which the punching unit 200 is detached.

Control Configuration of Image Forming Apparatus

Figure 3:
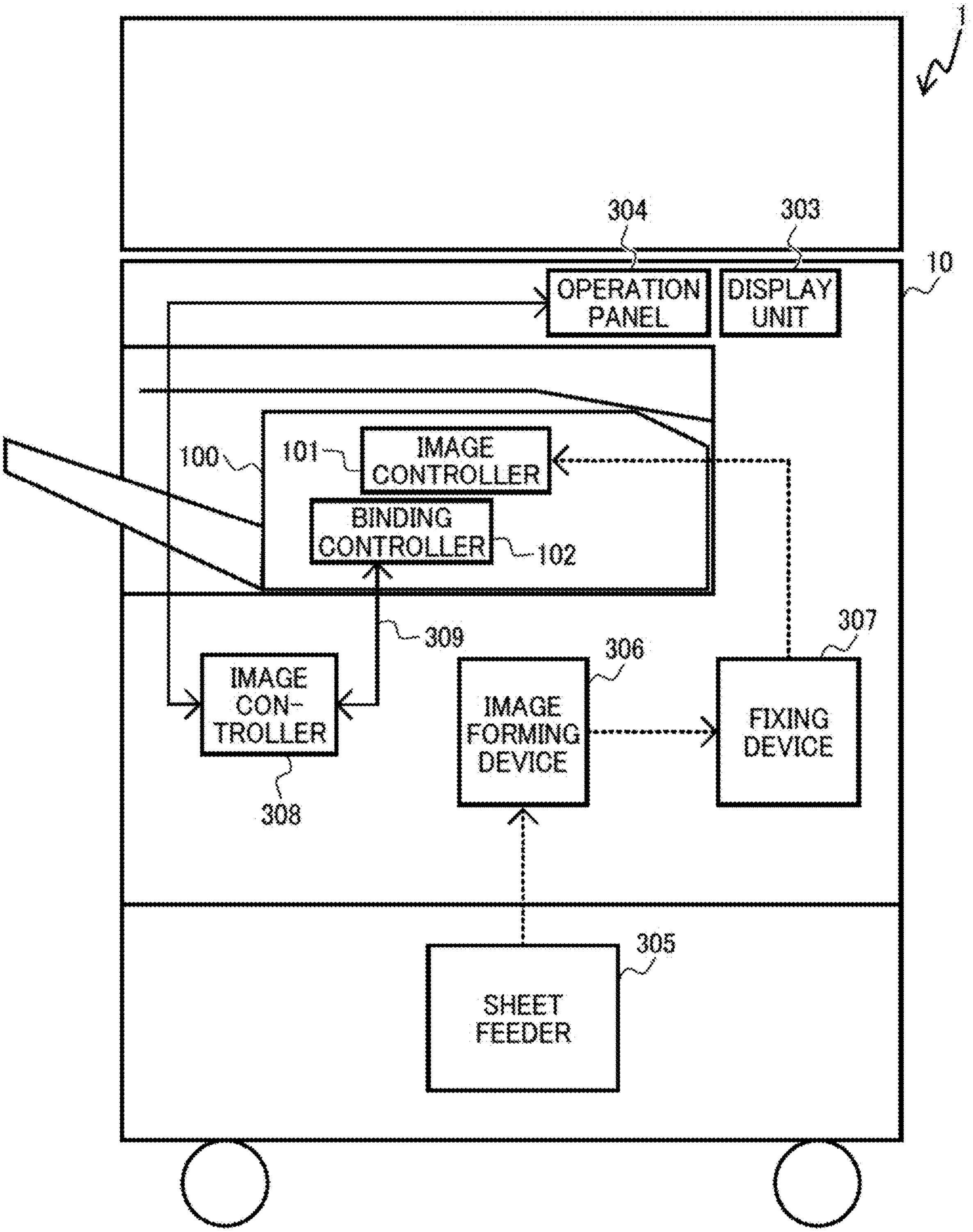
FIG. 3 is a functional block diagram of the image forming apparatus of FIG. 1, illustrating a control configuration of the image forming apparatus when a punching unit is detached, according to an embodiment of the present disclosure.

Next, a control configuration of the image forming apparatus 1 including the binding device 100 is described with reference to FIG. 3. FIG. 3 is a functional block diagram illustrating a control configuration of the image forming apparatus 1 when the punching unit 200 is detached.

In FIG. 3, a conveyance path of the sheet P, i.e., a flow in which the sheet P is conveyed, is indicated by a broken-line arrow. A path of a communication signal, i.e., a flow in which control signals pass through is indicated by a solid-line arrow.

The image forming apparatus 1 includes a display unit 303, a display-operation unit 304, and a sheet feeder 305. The display unit 303 notifies a user of conditions of various devices and operation contents. The display-operation unit 304 is an operation device for the user to perform operations such as setting a mode, setting the number of copies and selecting binding process. The sheet feeder 305 stores sheets P and separates and feeds the sheets P one by one. The image forming apparatus 1 also includes an image forming device 306 that forms latent images on photoconductors and transfers the latent images to the sheet P, and a fixing device 307 that fixes the images transferred to the sheet P. The image forming apparatus 1 further includes an image-formation controller 308 that controls the operation of each of the above-described units.

In the binding device 100 as the media processing apparatus according to the present embodiment, the binding controller 102 receives a processing instruction from the image-formation controller 308 of the image forming apparatus 1 via a communication line 309 and performs a designated processing on the sheet P designated by the binding controller 102.

The image-formation controller 308 and the binding controller 102 are connected to each other via the communication line 309, and data is exchangeable between the image-formation controller 308 and the binding controller 102. Accordingly, data such as operation modes, a size of the sheet P, and timing are exchanged between the image-formation controller 308 and the binding controller 102. Thus, the image forming apparatus 1 can be operated as a system.

Figure 5:
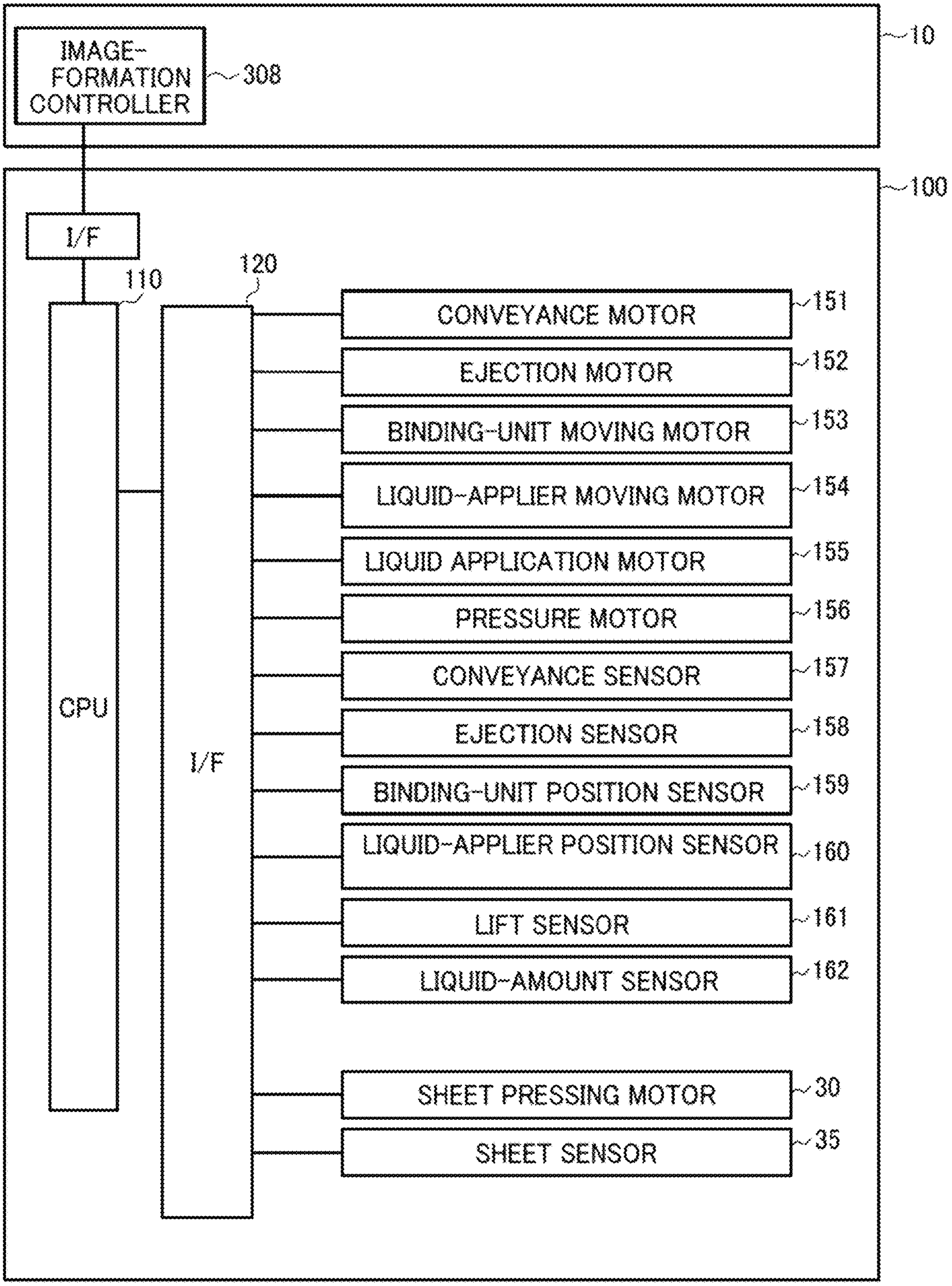
FIG. 5 is a functional block diagram of a binding device according to an embodiment of the present disclosure.

In FIG. 3, the binding device 100 includes an image processing controller 101 and a binding controller 102 as controllers. Controllers that are included in the binding device 100 according to embodiments of the present disclosure are not limited to the image processing controller 101 and the binding controller 102. The binding controller 102 may perform the processing performed by the image processing controller 101. Alternatively, the image processing controller 101 may perform the processing performed by the binding controller 102. Any controller may be employed for the image forming apparatus 1 as long as the image forming apparatus 1 has the functional configuration of the image forming apparatus 1 corresponding to the control block illustrated in FIG. 5. The control blocks illustrated in FIG. 5 are described in detail below.

Control Configuration of Image Forming Apparatus including Punching Unit

Figure 4:
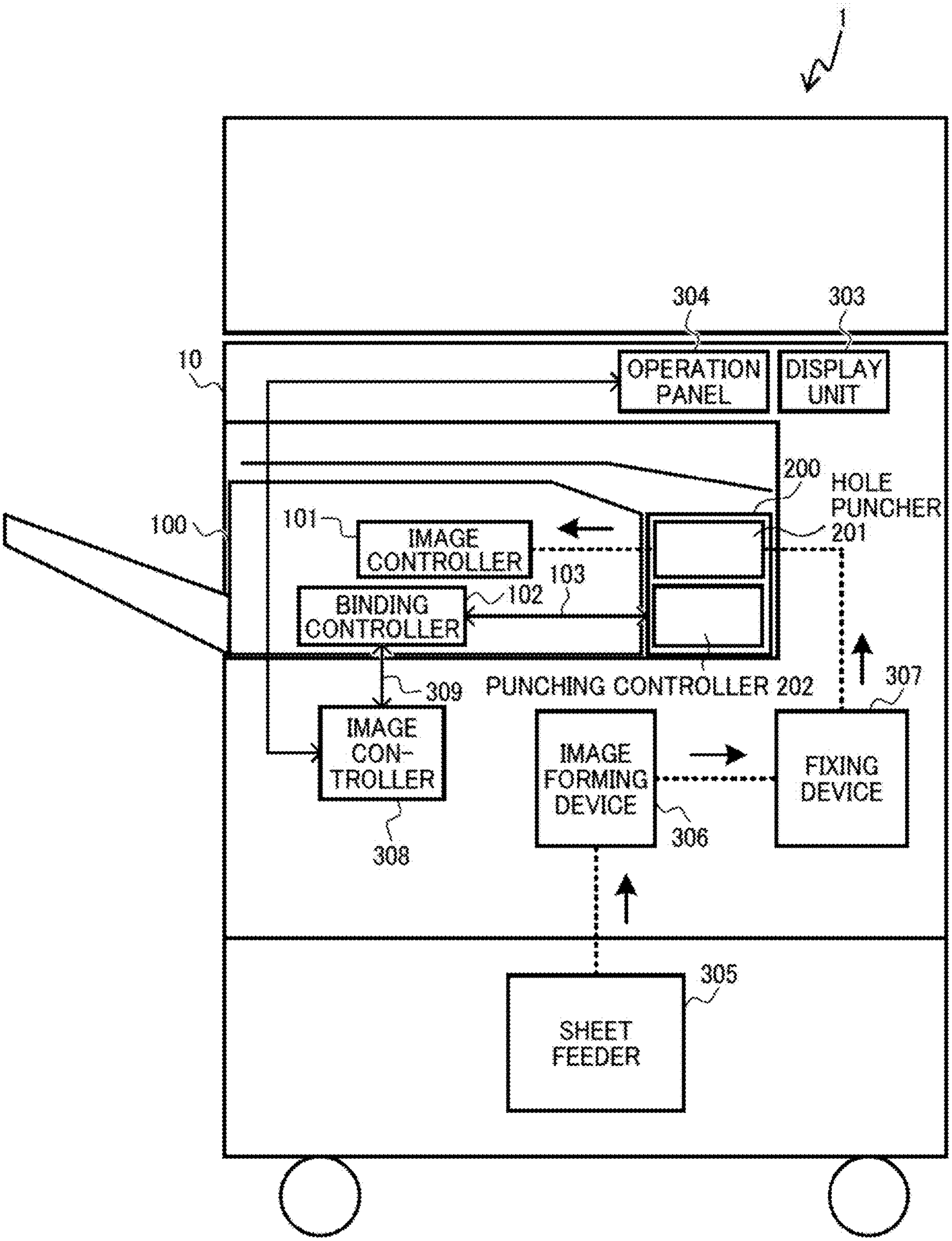
FIG. 4 is a functional block diagram the image forming apparatus of FIG. 1, according to a comparative example of the present disclosure.

FIG. 4 is a diagram illustrating a control configuration of the image forming apparatus 1 with the punching unit 200 attached to the image forming apparatus 1, according to an embodiment of the present disclosure. In FIG. 4, the conveyance path of the sheet P in which the sheet P is conveyed, is indicated by a dashed arrow, and the path of the communication signal, i.e., the flow of the control signal, is indicated by solid-line arrows.

In similar to the above-described configuration of the image forming apparatus 1 that does not include the punching unit 200, the image forming apparatus 1 with the punching unit 200 attached also includes the display unit 303, the display-operation unit 304, and the sheet feeder 305. The image forming apparatus 1 with the punching unit 200 attached also includes the image forming device 306 and the image-formation controller 308 in a similar manner to the image forming apparatus 1 that does not include the punching unit 200.

In the binding device 100 as the media processing apparatus according to the present embodiment, the binding controller 102 receives a processing instruction from the image-formation controller 308 of the image forming apparatus 1 via the communication line 309 and causes the binding device 100 to perform a designated processing on the sheet P designated by the binding controller 102. The binding controller 102 receives a notification indicating which processing is to be performed on the sheet P via a hole puncher 201.

The image-formation controller 308 and the binding controller 102 are connected to each other via the communication line 309, and data is exchangeable between the image-formation controller 308 and the binding controller 102. Accordingly, data such as operation modes, a size of the sheet P, and timing are exchanged between the image-formation controller 308 and the binding controller 102. Thus, the image forming apparatus 1 can be operated as a system.

In the punching unit 200, the image-formation controller 308 of the image forming apparatus 1 instructs the binding controller 102 to perform processing via the communication line 309, and the binding controller 102 instructs a punching controller 202 via a communication line 103. The punching controller 202 controls the hole puncher 201 such that the hole puncher 201 performs punching processing as instructed by the punching controller 202.

Hardware Configuration of Image Forming Apparatus 1

Next, a description is given of a hardware configuration of the binding device 100 provided for the image forming apparatus 1 with reference to FIG. 5. The hardware configuration of the image forming apparatus 1 including the punching unit 200 is omitted. As illustrated in FIG. 5, the binding device 100 includes a central processing unit (CPU) 110 as a controller and is connected to multiple motors that serve as power sources for the operations of the respective mechanisms via an interface (I/F) 120. The CPU 110 is an arithmetic unit and controls the entire operation of the binding device 100.

The CPU 110 of the binding device 100 is connected to the image-formation controller 308 of the image forming apparatus 1 via the I/F 120 and controls the binding device 100 in response to a processing signal from the image forming apparatus 1. The binding device 100 is also an optional device. For this reason, the binding device 100 is detachable from the image forming apparatus 1.

An I/F, such as a relay connector or a drawer connector, that connects the image forming device 300 and the binding device 100 is detachable from the image forming apparatus 1. In a similar manner, an I/F that connects the punching unit 200 and the image forming device 300 is detachable from the image forming apparatus 1.

Drive motors drive multiple conveyance roller pairs to perform the binding process in the binding device 100. The drive motors each include an encoder capable of detecting the amount of axial movement of the corresponding one of the drive motors by the number of pulses. Accordingly, the multiple conveyance roller pairs each can be driven and stopped at a position at which the respective drive motor moves by a specific amount of axial movement of the drive motor from a specific timing as a starting point. Thus, control can be performed such that a sheet P is conveyed in a predetermined direction by a predetermined amount.

Further, the encoder pulse output by each of the encoders is measured with the timing at which the sensor on the conveyance path is turned on or the timing at which the sensor is turned off as a starting point. Accordingly, the amount of axial movement of each of the drive motors can be calculated based on the measured encoder pulses. Then, the position of both ends of the sheet P in the sheet conveyance direction while the sheet P is conveyed can be determined based on the calculated amount of axial movement of each of the drive motors.

As illustrated in FIG. 5, the binding device 100 is connected to the CPU 110 via the I/F 120, a conveyance motor 151, an ejection motor 152, a binding-unit moving motor 153, a liquid-applier moving motor 154, a liquid-application motor 155, a pressure motor 156, a conveyance sensor 157, an ejection sensor 158, a binding-unit position sensor 159, a liquid-applier position sensor 160, a lift sensor 161, a liquid-amount sensor 162, a sheet-pressing motor 30, and a sheet sensor 35.

Configuration of Binding Device 100

Figure 6A:
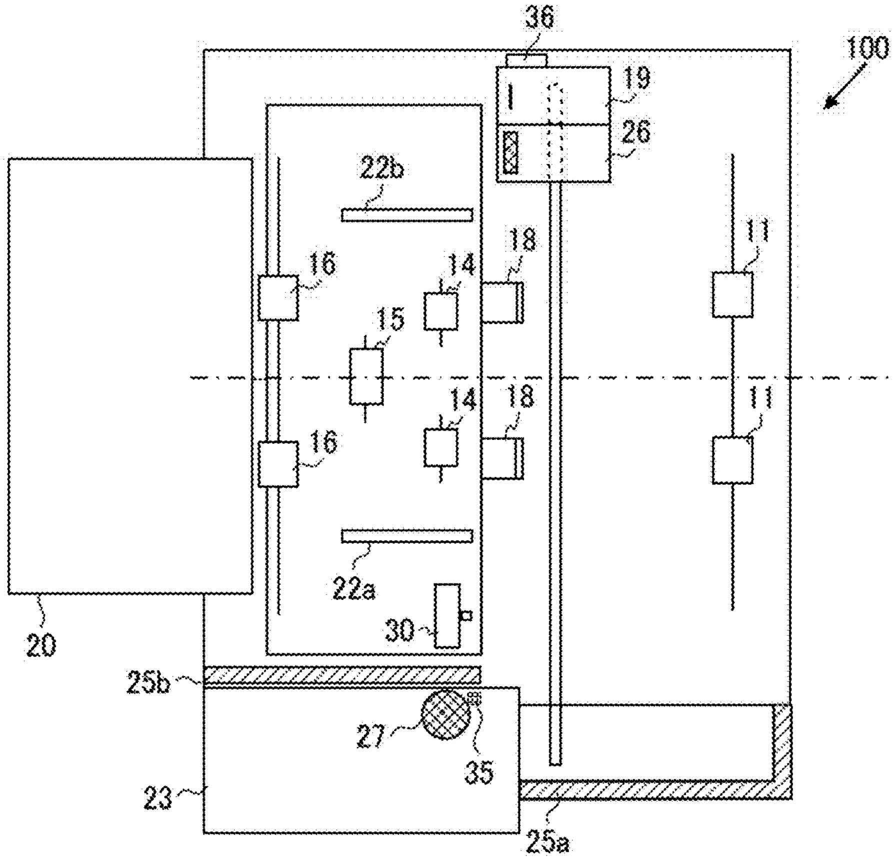
FIG. 6A is a plan view of a binding device according to an embodiment of the present disclosure.
Figure 6B:
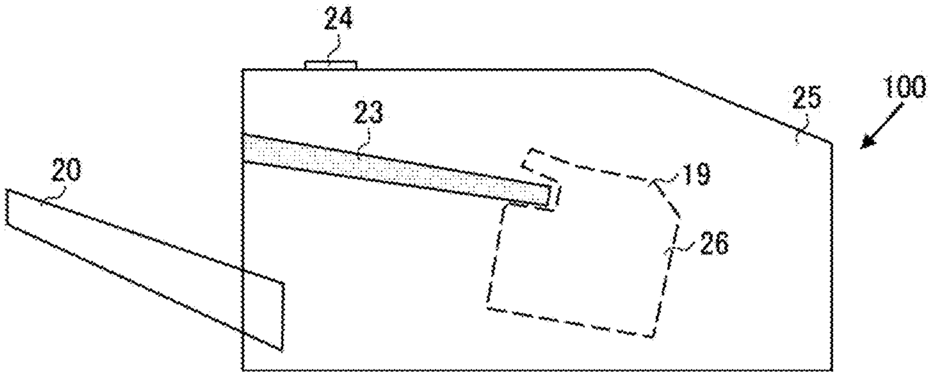
FIG. 6B is a side view of the binding device of FIG. 6A.
Figure 6C:
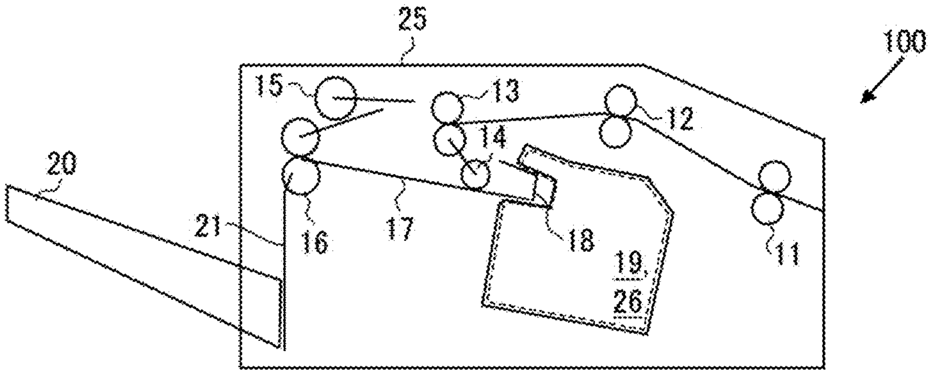
FIG. 6C is a cross-sectional view of the binding device of FIG. 6A, when sheets are conveyed to a stacking tray and aligned.

Next, a description is given of a configuration of the binding device 100 according to the present embodiment with reference to FIGS. 6A, 6B, and 6C. FIG. 6A is a plan view of the binding device 100. FIG. 6B is a side view of the binding device 100. FIG. 6C is a cross-sectional view of the binding device 100, illustrating a configuration of the binding device 100 when sheets P are conveyed to a stacking tray 17 and aligned.

As illustrated in FIG. 6A, the binding device 100 includes a press binder 19 as a press binder. The press binder 19 presses a sheet bundle Pb in which multiple sheets P are bundled and deforms a part of the sheet bundle Pb to perform press binding of the sheet bundle Pb, without using a binding needle. In addition, the binding device 100 includes a liquid applier 26 as a liquid applier. The liquid applier 26 applies liquid to a position, i.e., a binding position, of the sheet bundle Pb at which the press binding is performed to enhance the binding strength before the press binding is performed.

As illustrated in FIG. 6B, the binding device 100 includes a slit 23 in an exterior 25, which is a part of the housing of the binding device 100. In the slit 23, the press binding is performed on the sheet bundle Pb with the sheet bundle Pb being manually held. The slit 23 is disposed in a part of the exterior 25 and has an opening. The sheet bundle Pb is manually inserted as an object to be bound from the opening of the slit 23. By so doing, manual binding in which a predetermined position of the sheet bundle Pb is set as a binding position can be performed. In other words, the slit 23 serves as a space in which the sheet bundle Pb is manually inserted from the opening.

When the sheet bundle Pb is manually inserted into the slit 23 and the front end of the sheet bundle Pb reaches a predetermined position in the space of the slit 23, a sheet sensor 35 that is installed inside the slit 23 detects the sheet bundle Pb. Thus, the sheet sensor 35 serves as a sheet-bundle detector. The sheet sensor 35 notifies the CPU 110, which serves as a controller, that the sheet bundle Pb is detected. The CPU 110 determines whether the sheet bundle Pb is present at the predetermined binding position based on a control signal notified from the sheet sensor 35.

Next, a description is given of operation modes of the binding device 100 with reference to FIGS. 6A and 6B. Multiple operation modes can be set for the binding device 100. The binding device 100 can be operated based on the set operation mode as appropriate. The binding device 100 can set, as operation modes, for example, a "shift ejection mode" in which a sheet P is conveyed and ejected without being subjected to the binding process from upstream, i.e., a position at which the image forming device 300 is disposed, to the output tray 20, and a "binding mode" in which a sheet P is subjected to the binding process by the press binder 19.

In the shift ejection mode, the sheet P that is conveyed from the image forming apparatus 1 is received by entrance roller pairs 11, conveyed to ejection roller pairs 16, and ejected to the output tray 20.

In the binding mode, the sheet P that is conveyed from the image forming apparatus 1 is received by the entrance roller pairs 11 and conveyed to shift rollers 13 in the sheet conveyance direction. When the sheet P passes through the shift rollers 13, a tapping roller 15 is driven to place the sheet P on the stacking tray 17 as an internal tray. Subsequently, the tapping roller 15 and return rollers 14 are driven to convey the sheet P toward the rear end of the stacking tray 17 opposite the sheet conveyance direction. At this time, the sheets P are conveyed toward reference fences 18 such that the ends of the sheets P in the longitudinal direction of the sheets P are aligned.

In the binding mode, the operation of stacking the sheets P on the stacking tray 17 and conveying the sheets P to the reference fences 18 is repeated until the number of sheets P reaches the number of sheets to be bound. When a last sheet P to be bound is conveyed to the reference fences 18, the press binder 19 presses the leading ends of the bundle of sheets P, i.e., the sheet bundle Pb, to perform the binding process. The sheet bundle Pb that has been bound is ejected to the output tray 20 by the ejection roller pairs 16.

After the sheets P or the sheet bundle Pb are ejected to the output tray 20, the trailing ends of the sheets P or the trailing ends of the sheet bundle Pb contact an end fence 21 to be aligned.

When the online binding is performed, after the trailing ends of the sheet bundle Pb are aligned, the liquid applier 26 is controlled such that the liquid applier 26 applies a given amount of liquid in accordance with the number of sheets P of the sheet bundle Pb. Then, after the liquid has been applied to the sheet bundle Pb, the press binder 19 performs the binding process on the sheet bundle Pb. Control can also be performed such that the liquid is not applied to the sheet bundle Pb depending on the number of sheets P.

Manual Binding Process

When the binding process is performed on the sheet bundle Pb ejected to the output tray 20, the sheet bundle Pb is manually inserted into the slit 23. Then, the manual binding is performed when the sheet bundle Pb is detected by the sheet sensor 35 or when the process-start button 24, disposed on a part of the exterior 25 of the binding device 100, is pressed.

The manual binding is a process which includes multiple triggers with which the manual binding is started. For example, the manual binding is started when the process-start button 24 is pressed and pressing a process button displayed on an operation panel 340 starts the manual binding. Accordingly, the process-start button 24 and the operation panel 340 may also serve as an operation unit to instruct the start of manual binding.

A home position, i.e., an initial position for the press binder 19 as the binding device can also be set as a position, i.e., the binding position at which the manual binding is performed on the sheet bundle Pb inserted into the slit 23. In other words, when the sheet bundle Pb is manually inserted into the slit 23 and the end of the sheet bundle Pb contacts and is aligned with adjusting portions of the slit 23, the position that faces the end of the sheet bundle Pb can be set as the home position of the press binder 19. In this case, the adjusting portions of the slit 23 may be adjusted and positioned such that the end of the sheet bundle Pb at a predetermined position may serve as the binding position when the end of the sheet bundle Pb in the sheet-width direction and in the longitudinal direction. The adjusting portions are disposed inside the slit 23.

As illustrated in FIG. 6A, the slit 23 includes a conveyance-direction stopper 25*a* and a width-direction stopper 25*b* as the adjusting portions to position the sheet bundle Pb. The conveyance-direction stopper 25*a* contacts the sheet bundle Pb in a direction corresponding to the sheet conveyance direction when the sheet bundle Pb is ejected from the binding device 100. The width-direction stopper 25*b* includes a linear portion as a portion that contacts the sheet bundle Pb in the width direction which is a direction orthogonal to the sheet conveyance direction of the sheet P. The positions of the conveyance-direction stopper 25*a* and the width-direction stopper 25*b* are adjusted and fixed such that the position of the sheet bundle Pb inserted into the slit 23 is the binding position when the conveyance-direction stopper 25*a* contacts the sheet bundle Pb in the sheet conveyance direction and the width-direction stopper 25*b* contacts the sheet bundle Pb in the direction orthogonal to the sheet conveyance direction. Then, the home position of the press binder 19 is set such that the end of the sheet bundle Pb is set as the binding position when the conveyance-direction stopper 25*a* contacts the sheet bundle Pb in the sheet conveyance direction and the width-direction stopper 25*b* contacts the sheet bundle Pb in the direction orthogonal to the sheet conveyance direction. Setting the home position of the press binder 19 as described above allows the manual binding to be performed at a position at which the binding device 100 starts operating.

Next, a description is given of an example of the manual binding process. First, the sheet bundle Pb is manually inserted into the slit 23. As illustrated in FIG. 6A, the slit 23 includes the sheet sensor 35 that detects the presence of the sheet bundle Pb. Accordingly, when the sheet bundle Pb is inserted into the slit 23 and contacts the conveyance-direction stopper 25*a* and the width-direction stopper 25*b*, the sheet sensor 35 detects the sheet bundle Pb and notifies the CPU 110 as the controller.

When the CPU 110 receives a control signal indicating the presence of the sheet bundle Pb from the sheet sensor 35 for a predetermined time, the CPU 110 causes the sheet-pressing motor 30 to drive to move the sheet-bundle holder 27 (see FIGS. 7A, 7B, and 7C) as a media-fixing device to a predetermined sheet pressing position. The sheet-bundle holder 27 presses a part of the sheet bundle Pb in contact with the conveyance-direction stopper 25*a* and the width-direction stopper 25*b* in the thickness direction of the sheet bundle Pb. When the sheet-bundle holder 27 is moved to the sheet pressing position, the sheet bundle Pb is sandwiched between a flat surface of the slit 23 and the sheet-bundle holder 27. Thus, the sheet bundle Pb is held at a predetermined position.

The sheet bundle Pb that is manually inserted into the slit 23 is fixed by the sheet-bundle holder 27. Accordingly, the position of the sheet bundle Pb can be prevented from being shifted until the binding process on the sheet bundle Pb is completed.

Figure 7A:
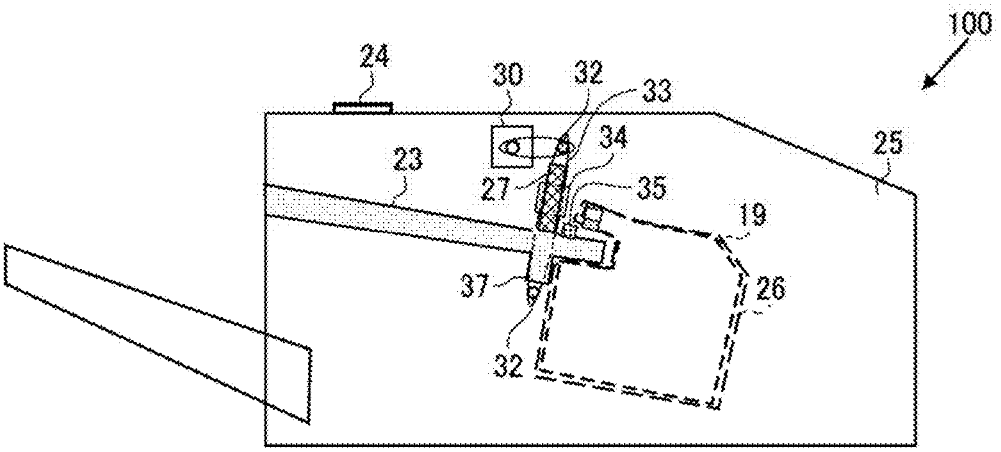
FIG. 7A is a diagram illustrating a binding device when manual binding is performed before a sheet bundle is inserted into a slit, according to an embodiment of the present disclosure.
Figure 7B:
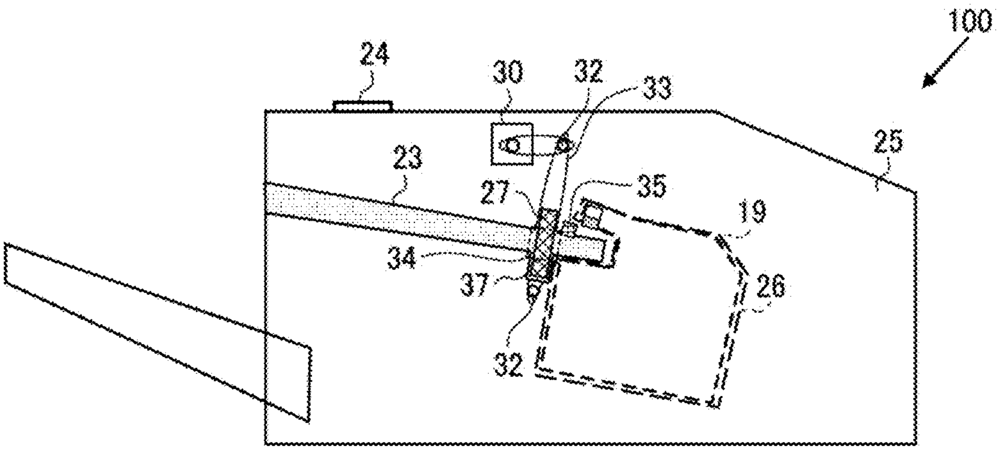
FIG. 7B is a diagram illustrating the binding device of FIG. 7A when a sheet-bundle fixing mechanism is operated, according to an embodiment of the present disclosure.
Figure 7C:
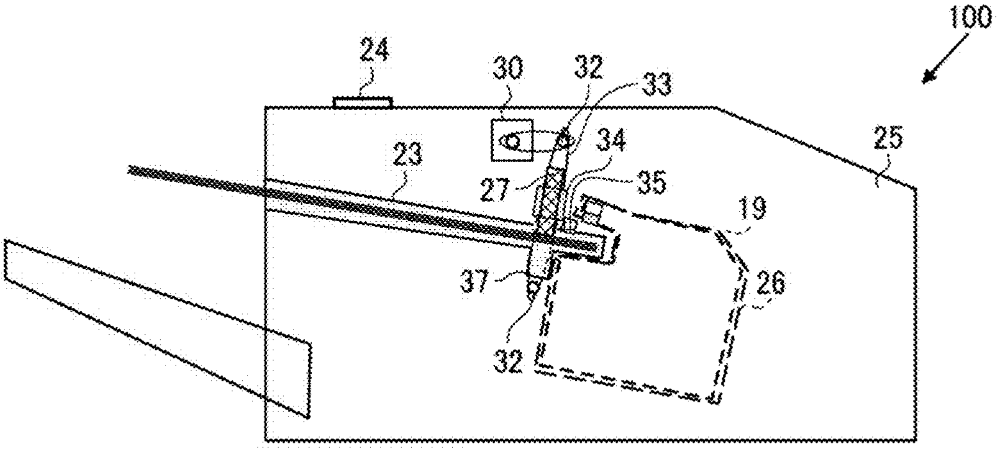
FIG. 7C is a diagram illustrating the binding device of FIG. 7A when a sheet bundle is inserted into the slit and the sheet bundle fixing mechanism is operated to perform the manual binding, according to an embodiment of the present disclosure.

Next, a description is given of an embodiment of the sheet-bundle holder 27 as the media-fixing device that fixes the sheet bundle Pb when the manual binding is performed in detail. FIG. 7A is a diagram illustrating the binding device 100 when the manual binding is performed before the sheet bundle Pb is inserted into the slit 23. FIG. 7B is a diagram illustrating the binding device 100 when a sheet-bundle fixing mechanism is operated. FIG. 7C is a diagram illustrating the binding device 100 when the sheet bundle Pb is inserted into the slit 23 and the sheet bundle fixing mechanism is operated to perform the manual binding.

As illustrated in FIG. 7A, in the binding device 100, the sheet sensor 35 is disposed at a portion of the slit 23. As illustrated in FIG. 6A, the sheet sensor 35 is disposed at the portion of the slit 23, which is a rear portion of the slit 23 when viewed from the opening of the slit 23.

The sheet-bundle holder 27 as the media-fixing device is a rod-shaped member held to be movable in a direction orthogonal to the flat surface of the slit 23. The sheet-bundle holder 27 is, for example, cylindrical. However, the shape of the sheet-bundle holder 27 is not limited to the cylindrical shape and may be a prismatic shape or an elliptical shape in cross section.

Preferably, a portion of the sheet-bundle holder 27 that presses the sheet bundle Pb, i.e., a holding portion, has elasticity to an extent such that the sheet-bundle holder 27 may not damage the sheet P. In addition, the portion of the sheet-bundle holder 27 that presses the sheet bundle Pb, in other words, a tip of the sheet-bundle holder 27 may be a member having water resistance. In this case, when the portion of the sheet bundle Pb to which the liquid is applied is pressed, the liquid can be prevented from permeating from the sheet P to the sheet-bundle holder 27. Accordingly, the sheet-bundle holder 27 can be prevented from being deteriorated.

The slit 23 includes a recess 37 extending in a direction orthogonal to the flat surface of the slit 23 such that the sheet-bundle holder 27 can move in the direction orthogonal to the flat surface of the slit 23. The recess 37 is formed below the lower surface of the slit 23.

The sheet-bundle holder 27 is attached to a fixing plate 34. The fixing plate 34 includes a shaft 32, and the shaft 32 is surrounded by a belt 33. The belt 33 is wound around a rotary shaft of the sheet-pressing motor 30. When the sheet-pressing motor 30 rotates, the belt 33 rotates. When the belt 33 rotates, the shaft 32 that is surrounded by the belt 33 rotates, and the fixing plate 34 moves in accordance with the direction of rotation of the belt 33. When the fixing plate 34 moves, the sheet-bundle holder 27 moves in a similar direction.

Accordingly, when the sheet-pressing motor 30 is driven, as illustrated in FIG. 7B, the sheet-bundle holder 27 moves in a direction penetrating the flat surface of the slit 23, and the tip end of the sheet-bundle holder 27 moves to reach the recess 37. In other words, the sheet-bundle holder 27 moves in the vertical direction with respect to the slit 23.

As illustrated in FIG. 7C, when the sheet bundle Pb is inserted into the slit 23, the sheet sensor 35 detects the sheet bundle Pb for a predetermined time, and the sheet-pressing motor 30 is driven, the sheet-bundle holder 27 moves to a position at which the sheet-bundle holder 27 presses the sheet bundle Pb in the direction orthogonal to the flat surface of the slit 23. Thus, the sheet bundle Pb is fixed.

The sheet-pressing motor 30 moves the sheet-bundle holder 27 to press a part of the sheet bundle Pb by the sheet-bundle holder 27 to hold the sheet bundle Pb at a predetermined position of the slit 23. The CPU 110 calculates the amount of movement of the sheet-bundle holder 27 from the number of drive pulses of the sheet-pressing motor

30. In addition, the CPU 110 detects the drive load of the sheet-pressing motor 30. By so doing, the CPU 110 determines the thickness of the sheet bundle Pb, i.e., the dimension of the sheet bundle Pb in the thickness direction.

The CPU 110 determines whether to apply liquid before performing the press-binding process or to perform the press-binding process without applying the liquid. Then, based on the determination, predetermined manual binding is performed.

Thickness Determination Process of Sheet Bundle Pb

A description is now given below of a thickness determination process of the sheet bundle Pb performed in accordance with the operation of the sheet-bundle holder 27 in detail.

Figure 8A:
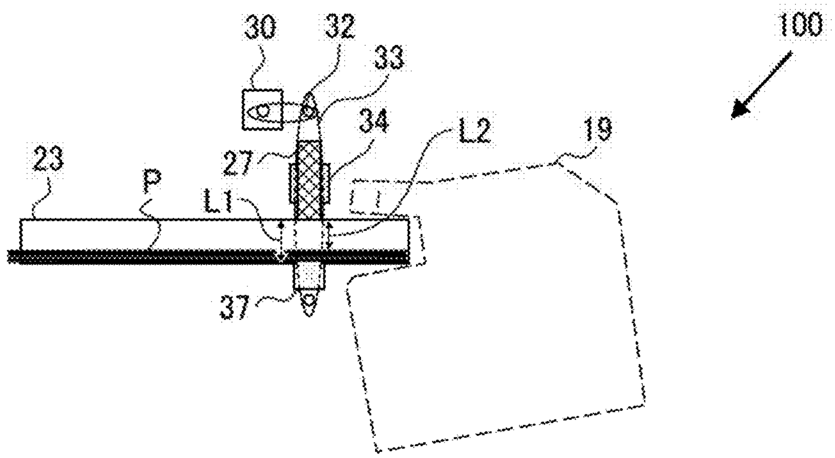
FIGS. 8A, 8B, and 8C are diagrams each illustrating a slit and a sheet-bundle holder in which the sheet-bundle holder presses a sheet bundle inserted into the slit, according to an embodiment of the present disclosure.
Figure 8B:
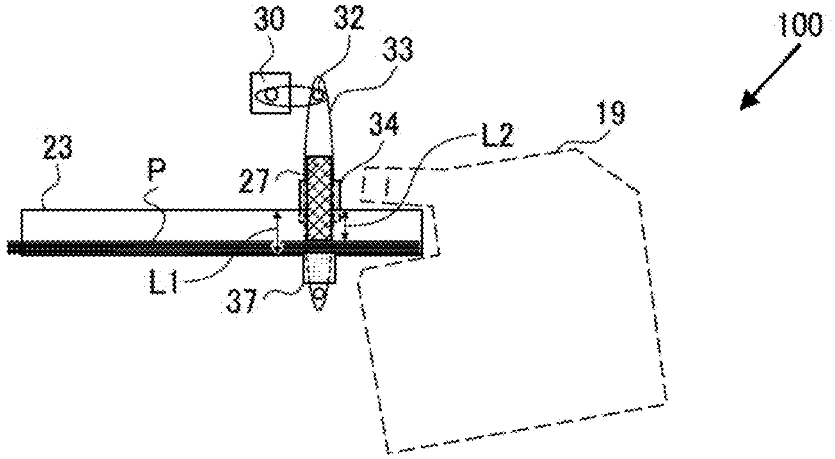

As illustrated in FIG. 8A, the sheet bundle Pb is inserted into the slit 23. Then, the sheet sensor 35 described above detects the sheet bundle Pb, or the process-start button 24 disposed on the housing is manually pressed. Accordingly, as illustrated in FIG. 8B, the sheet-bundle holder 27 is moved toward the recess 37 by the rotational driving of the sheet-pressing motor 30 to press a part of the sheet bundle Pb. As a result, the sheet bundle Pb is held in the slit 23 and does not move. In other words, the sheet bundle Pb is fixed at the predetermined position of the slit 23.

When the sheet-bundle holder 27 moves to press the sheet bundle Pb and contacts the sheet bundle Pb, the drive load of the sheet-pressing motor 30 increases. For this reason, the value of the drive voltage applied to drive the sheet-pressing motor 30 varies. The CPU 110 detects the change in the drive voltage, thus stops the driving of the sheet-pressing motor 30.

Figure 8C:
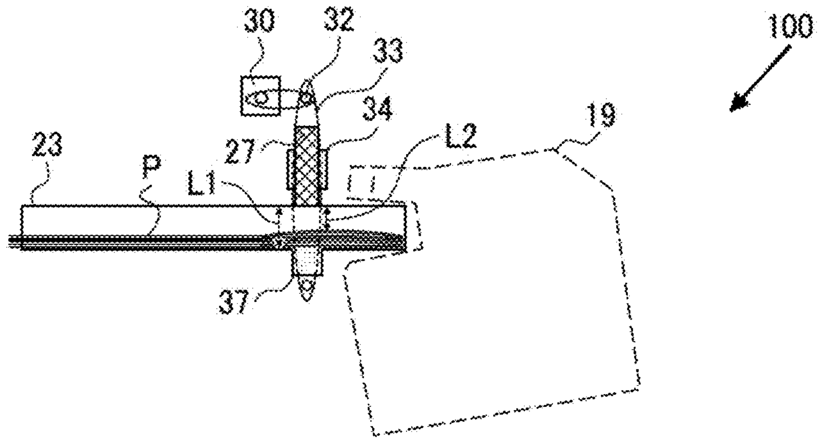

The sheet-bundle holder 27 contacts the sheet bundle Pb. Accordingly, the binding position of the sheet bundle Pb is held at a position at which the sheet-bundle holder 27 can face the press binder 19. In this case, even if the shape of the sheet bundle Pb that is inserted into the slit 23 is slightly distorted as illustrated in FIG. 8C, the sheet-bundle holder 27 presses the vicinity of the binding position to correct the distortion in the vicinity of the binding position. Accordingly, the binding process can be reliably performed.

The sheet-pressing motor 30 includes an encoder to detect the amount of movement of the sheet-pressing motor 30. The CPU 110 detects the output of the encoder. By so doing, the CPU 110 can calculate the amount of movement of the sheet-pressing motor 30. For example, the sheet-pressing motor 30 may be a direct current (DC) motor. The CPU 110 can calculate a movement length L2 (see FIG. 8B), which is a distance in which the sheet-bundle holder 27 moves from the initial position (the position illustrated in FIG. 8A) to the position at which the sheet-bundle holder 27 presses the sheet bundle Pb, from the rotation per unit time of the sheet-pressing motor 30. The CPU 110 also measures a slit interval L1 (see FIG. 8B), which is a distance from the initial position of the sheet-bundle holder 27 to the bottom face of the slit 23 in advance and stores the slit interval L1 in the storage unit.

The CPU 110 can calculate the thicknesses of the sheet bundle Pb inserted in the slit 23 by subtracting the movement length L2 from the slit interval L1. Setting the thickness of each of the sheets P of the sheet bundle Pb in advance allows the CPU 110 to calculate the number of sheets P that can be included in the sheet bundle Pb from the thickness of the sheet P.

The CPU 110 controls whether to apply liquid based on the calculated number of sheets P, i.e., the thickness of the sheet bundle Pb when the press binder 19 performs the press binding. When the number of sheets P is larger than the predetermined threshold number of sheets, the liquid is applied to the sheet bundle Pb to enhance the binding strength. However, the time until the pressure binding is completed is longer. For this reason, the productivity is not enhanced. Alternatively, if the number of sheets P is smaller than the predetermined threshold number of sheets, the binding strength can be maintained without applying the liquid to the sheet bundle Pb. Accordingly, the liquid is not applied to the sheet bundle Pb. By so doing, the time until the press binding is completed can be shortened while improving the productivity. At the same time, the binding strength can be maintained.

In other words, the CPU 110 can control to switch whether to apply the liquid in the press-binding process based on the thickness, i.e., the number of sheets P, of the sheet bundle Pb, which can be calculated by using the sheet-bundle holder 27, while the sheet bundle Pb is fixed and held by using the sheet-bundle holder 27 to stabilize the condition of the sheet bundle Pb when the sheet bundle Pb is press bound.

The CPU 110 can control such that the binding process may be stopped based on the calculated thickness of the sheet bundle Pb and the number of sheets P.

First Embodiment

Figure 9A:
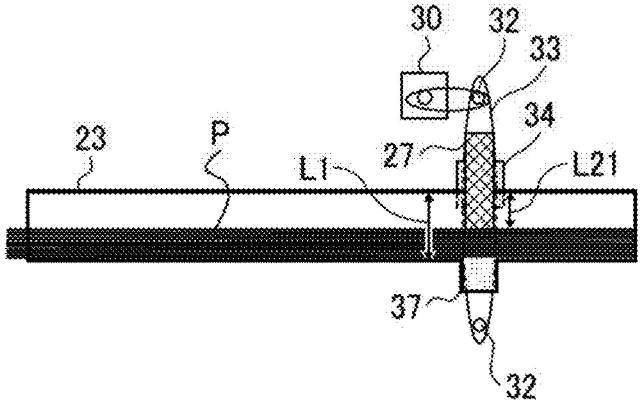
FIG. 9A is a diagram illustrating a slit and a sheet-bundle holder in which the number of sheets of a sheet bundle inserted into the slit is twenty, according to an embodiment of the present disclosure.
Figure 9B:
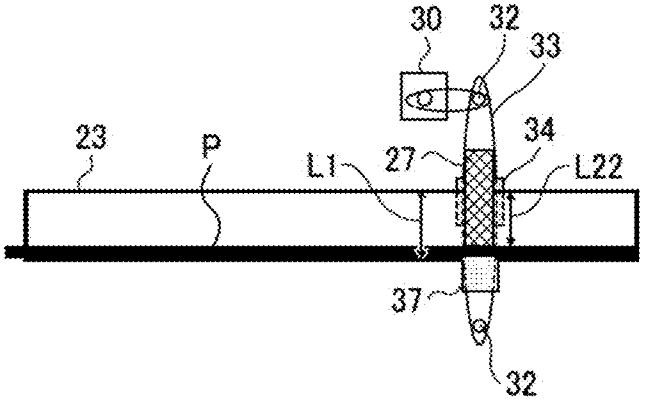
FIG. 9B is a diagram illustrating the slit and the sheet-bundle holder of FIG. 9A in which the number of sheets of the sheet bundle inserted into the slit is five, according to an embodiment of the present disclosure.
Figure 9C:
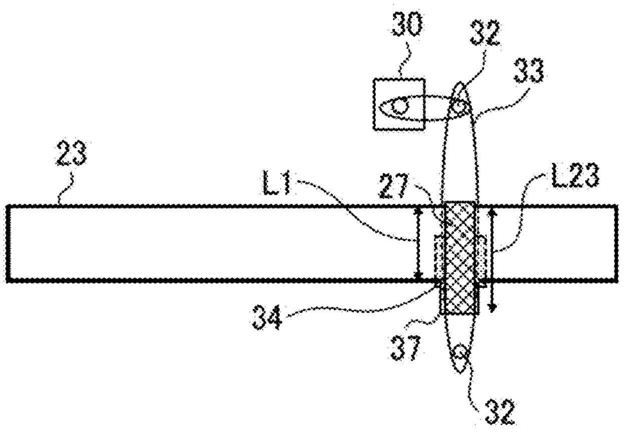
FIG. 9C is a diagram illustrating the slit and the sheet-bundle holder of FIG. 9A in which the sheet bundle is not inserted into the slit, according to an embodiment of the present disclosure.

Next, a description is given of a procedure of the manual binding performed by the binding device 100 with reference to FIGS. 9A, 9B, 9C, and 10. FIG. 9A is a diagram illustrating the slit 23 and the sheet-bundle holder 27 in which the number of sheets P of the sheet bundle Pb inserted into the slit 23 is twenty. FIG. 9B is a diagram illustrating the slit 23 and the sheet-bundle holder 27 in which the number of sheets P of the sheet bundle Pb inserted into the slit 23 is five. FIG. 9C is a diagram illustrating the slit 23 and the sheet-bundle holder 27 in which the sheet bundle Pb is not inserted into the slit 23.

Figure 10:
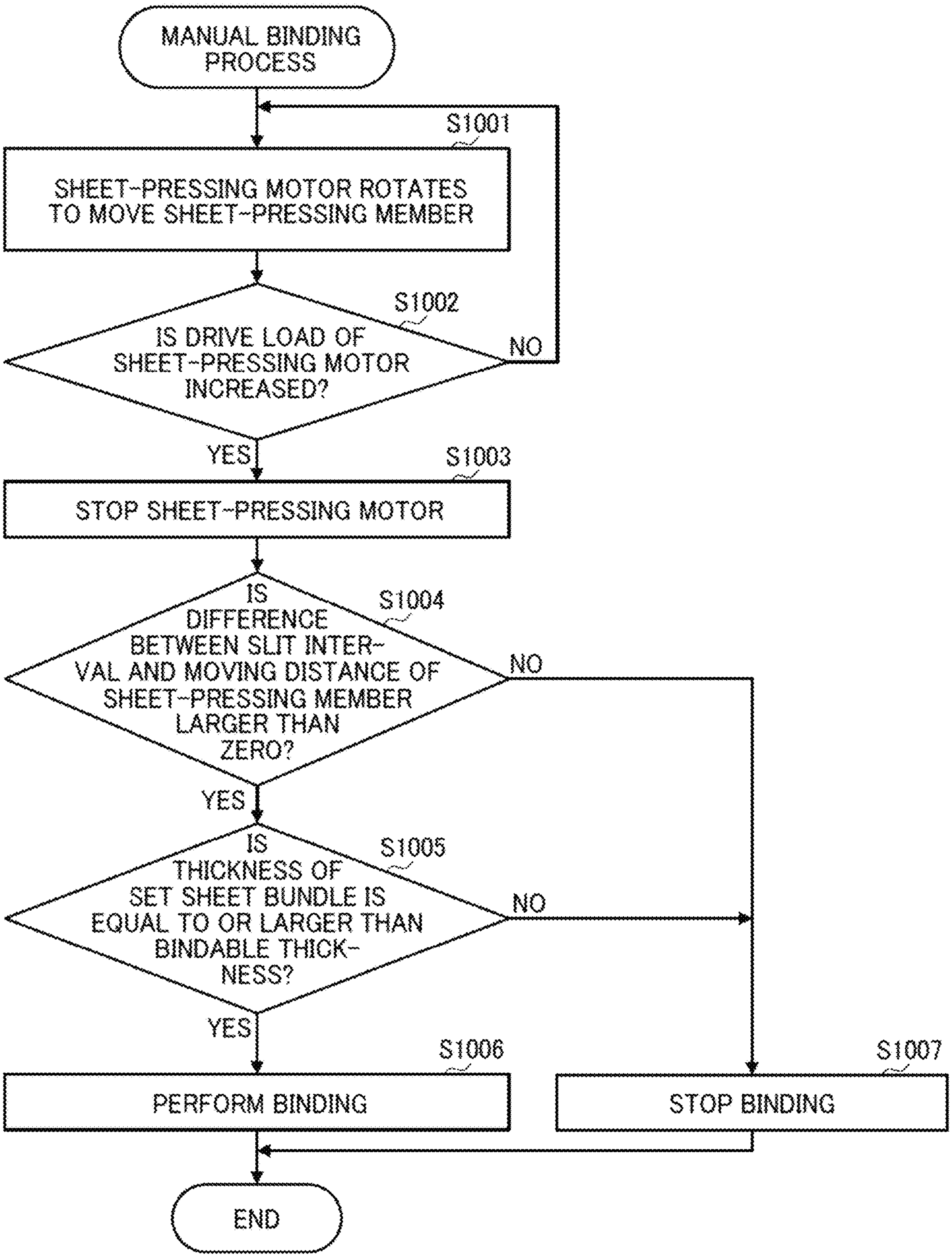
FIG. 10 is a flowchart of a procedure of a manual-binding process, according to a first embodiment of the present disclosure.

FIG. 10 is a flowchart of a procedure of the manual binding, according to the present embodiment. First, when the sheet bundle Pb is manually inserted into the slit 23 and the process-start button 24 is pressed, the sheet-pressing motor 30 rotates and the sheet-bundle holder 27 moves toward the sheet bundle Pb set in the slit 23 and the recess 37 (step S1001).

When the sheet-bundle holder 27 contacts the sheet bundle Pb or the recess 37, the drive load of the sheet-pressing motor 30 increases. Accordingly, the value of the drive voltage applied to the sheet-pressing motor 30 changes. Thus, whether the drive load of the sheet-pressing motor 30 is increased is determined (step S1002). When the CPU 110 detects that the value of the drive voltage has changed, the CPU 110 determines that the drive load of the sheet-pressing motor 30 has increased (YES in step S1002), and the operation of the sheet-pressing motor 30 is stopped (step S1003).

Subsequently, the CPU 110 calculates the movement length L2, which is the distance in which the sheet-bundle holder 27 moves, from the rotation per unit time of the sheet-pressing motor 30. In the present embodiment, the movement length L2 in FIG. 9A is a first movement length L21. The movement length L2 in FIG. 9B is a second movement length L22. The movement length L2 in FIG. 9C is a third moving length L23. The slit interval L1 corresponds to the height of the slit 23.

In the present embodiment, the relation between the slit interval L1 and the movement distance of the sheet-bundle holder 27 is as follows. (L−L1)>0, (L−L2)>0, and (L−L23)

<0 (step S1004). Accordingly, in the case illustrated in FIG. 9C (NO in step S1004), in other words, when CPU 110 determines that the difference between the slit interval L1 and the movement amount of the sheet-bundle holder 27 is a negative value, the sheet bundle Pb is not set. Accordingly, the CPU 110 stops the binding process (step S1007).

Alternatively, when the CPU 110 determines that the difference between the slit interval L1 and the movement amount of the sheet-bundle holder 27 is a positive value (YES in step S1004), the width of the sheet bundle Pb is as follows as illustrated in FIG. 9A. (L1−L21) or (L1−L22) In the present embodiment, the thickness of the sheet bundle Pb that can be subjected to the binding process is Lmax. When (L1−L21) is equal to or smaller than Lmax and (L1−L22) is equal to or smaller than Lmax (YES in step S1005), the binding process is performed (step S1006).

By contrast, when (L−L1) is larger than Lmax, (L−L1)>Lmax and (L−L2) is larger than Lmax, (L−L2)>Lmax (NO in step S1005), the manual binding is stopped (step S1007).

The processing performed from steps S1001 to S1005 is processing corresponding to the determination of the thickness of the sheet bundle Pb described with reference to FIGS. 8A, 8B, and 8C. In other words, to prevent the binding position of the sheet bundle Pb from being shifted in the manual binding process, the thickness of the sheet bundle Pb is measured and determined by using the mechanism to hold the sheet bundle Pb, i.e., the sheet-bundle holder 27 and the mechanism to move the sheet-bundle holder 27. The process to determine the thickness of the sheet bundle Pb can be applied to the following embodiments in a substantially similar manner.

Second Embodiment

Figure 11:
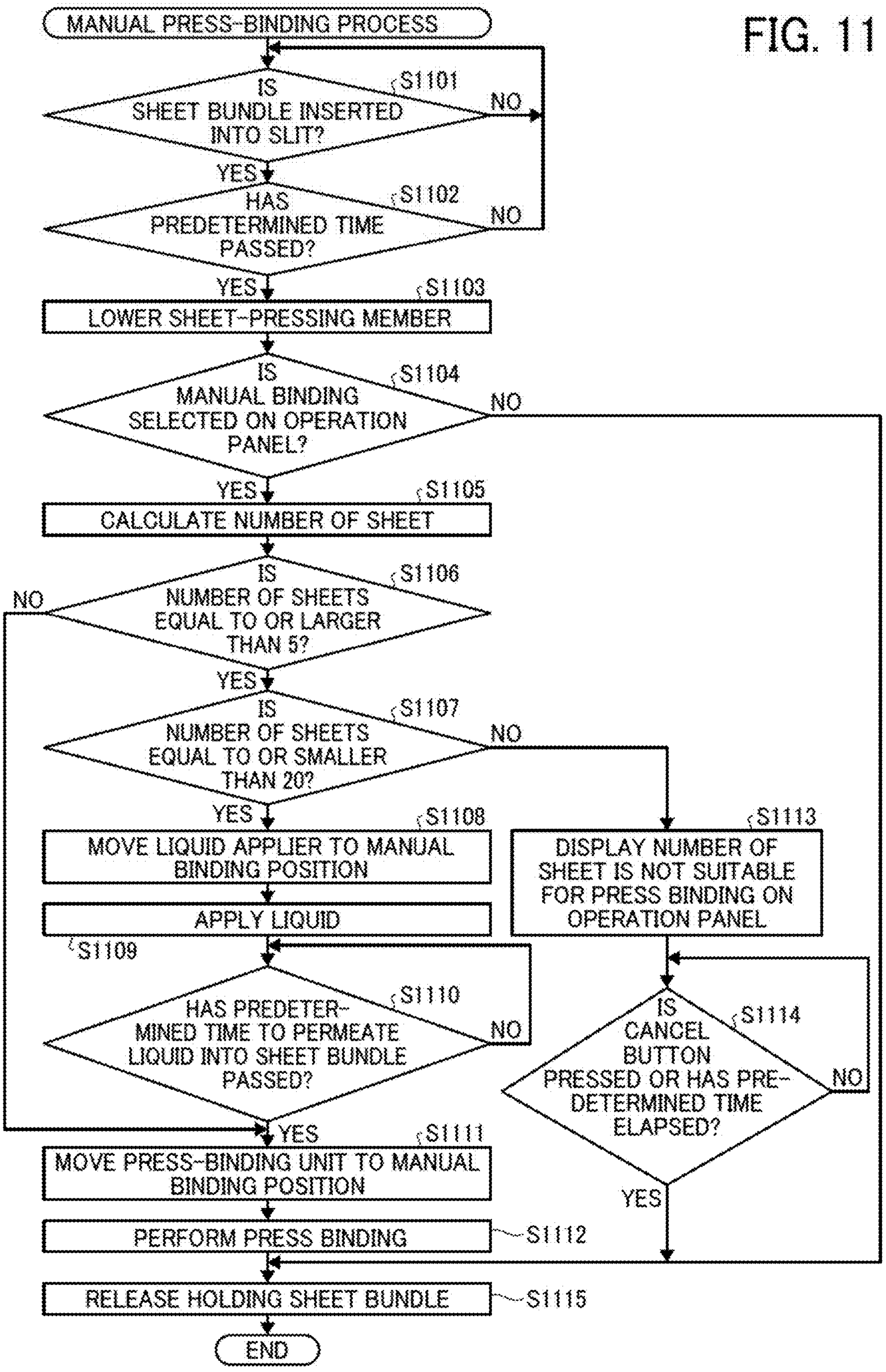
FIG. 11 is a flowchart of a procedure of a manual-binding process according to a second embodiment of the present disclosure.

Next, a description is given of a procedure of the manual binding performed by the binding device 100 according to a second embodiment. FIG. 11 is a flowchart of the procedure of the manual-binding process performed by the binding device 100 according to the present embodiment. First, the sheet sensor 35 detects whether the sheet bundle Pb is inserted into the slit 23 and reaches a predetermined position (step S1101). The process loops until the sheet bundle Pb is detected in the slit 23 (NO in step S1101).

When the sheet bundle Pb is detected (YES in step S1101), the CPU 110 determines whether the detection period of the sheet bundle Pb has passed a predetermined time (step S1102). If the predetermined time has not elapsed, the process returns to step S1101 (NO in step S1102). If the predetermined time has elapsed (YES in step S1102), the sheet-pressing motor 30 is operated to lower the sheet-bundle holder 27, and the sheet-bundle holder 27 presses a part of the sheet bundle Pb. Thus, the sheet-bundle holder 27 holds the position of the sheet bundle Pb (step S1103).

Figures 12, 13:
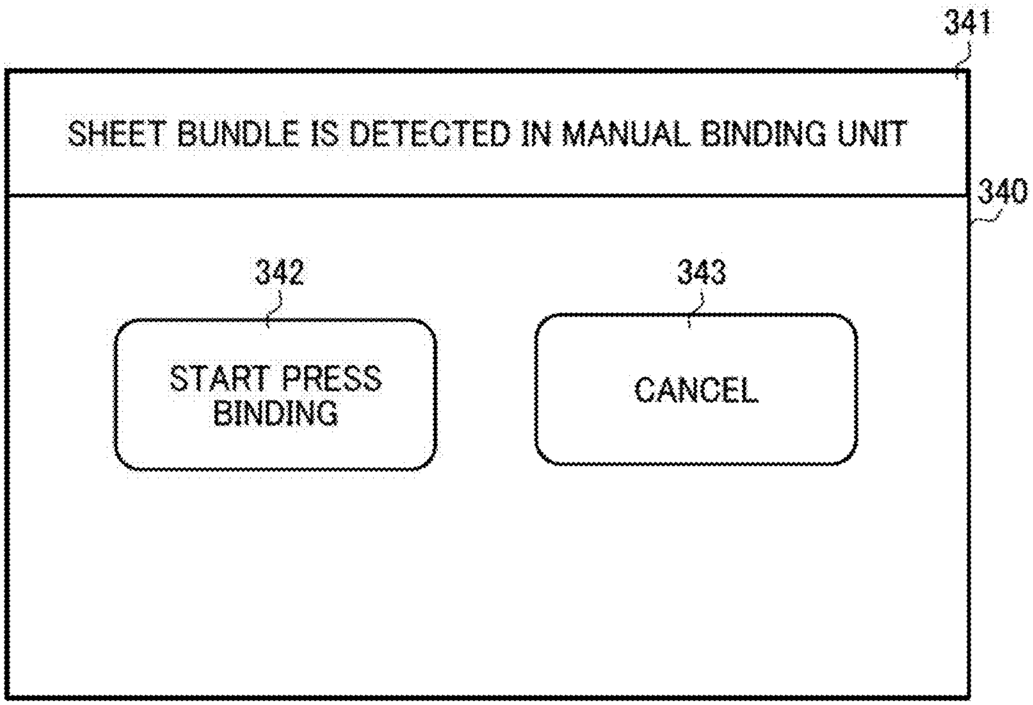
FIG. 12 is a view of an operation screen of an image forming apparatus, displayed in the binding process, according to an embodiment of the present disclosure.
FIG. 13 is a table indicating data employed to determine whether to perform a binding process, according to an embodiment of the present disclosure.

When the sheet bundle Pb is held, a notification screen 341 illustrated in FIG. 12 is displayed on an operation panel 340. The operation panel 340 includes the notification screen 341 to notify that the sheet bundle Pb is detected, a start press-binding button 342 that serves as a trigger to start the press binding, and a cancel button 343 to instruct cancellation of the press-binding process.

When the cancel button 343 is pressed on the operation panel 340 (NO in step S1104), the sheet-bundle holder 27 is lifted to release the sheet bundle Pb from being held (step S1115), and the press-binding process is ended.

When the start press-binding button 342 is pressed on the operation panel 340 (YES in step S1104), the CPU 110 calculates the movement length L2 when the sheet-bundle holder 27 is lowered in step S1103 and calculates the number of sheets P by subtracting the movement length L2 from the slit interval L1 (step S1105).

Subsequently, the CPU 110 compares the calculated number of sheets P with the threshold value. FIG. 13 is a table including data employed to determine whether to perform the binding process, according to an embodiment of the present disclosure. As illustrated in a process determination table T400 of FIG. 13, "One to five sheets", "Six to nineteen sheets", and "Twenty sheets or more" are set as thresholds of the number of sheets N as the calculated number of sheets P.

When the number of sheets N is equal to or greater than six (YES in step S1106) and is not equal to or smaller than nineteen (NO in step S1107), a message that indicates that the number of sheets is not suitable for the press-binding process is displayed in the notification screen 341 of the operation panel 340 (step S1103). Then, the above-described process is looped until the cancel button 343 of the operation panel 340 is pressed or a predetermined time elapses (NO in step S1114). When the cancel button 343 is pressed or the predetermined time has elapsed (YES in step S1114), the sheet-bundle holder 27 is lifted to release the sheet bundle Pb from being held (step S1115), and the manual-binding process is ended.

Figure 14:
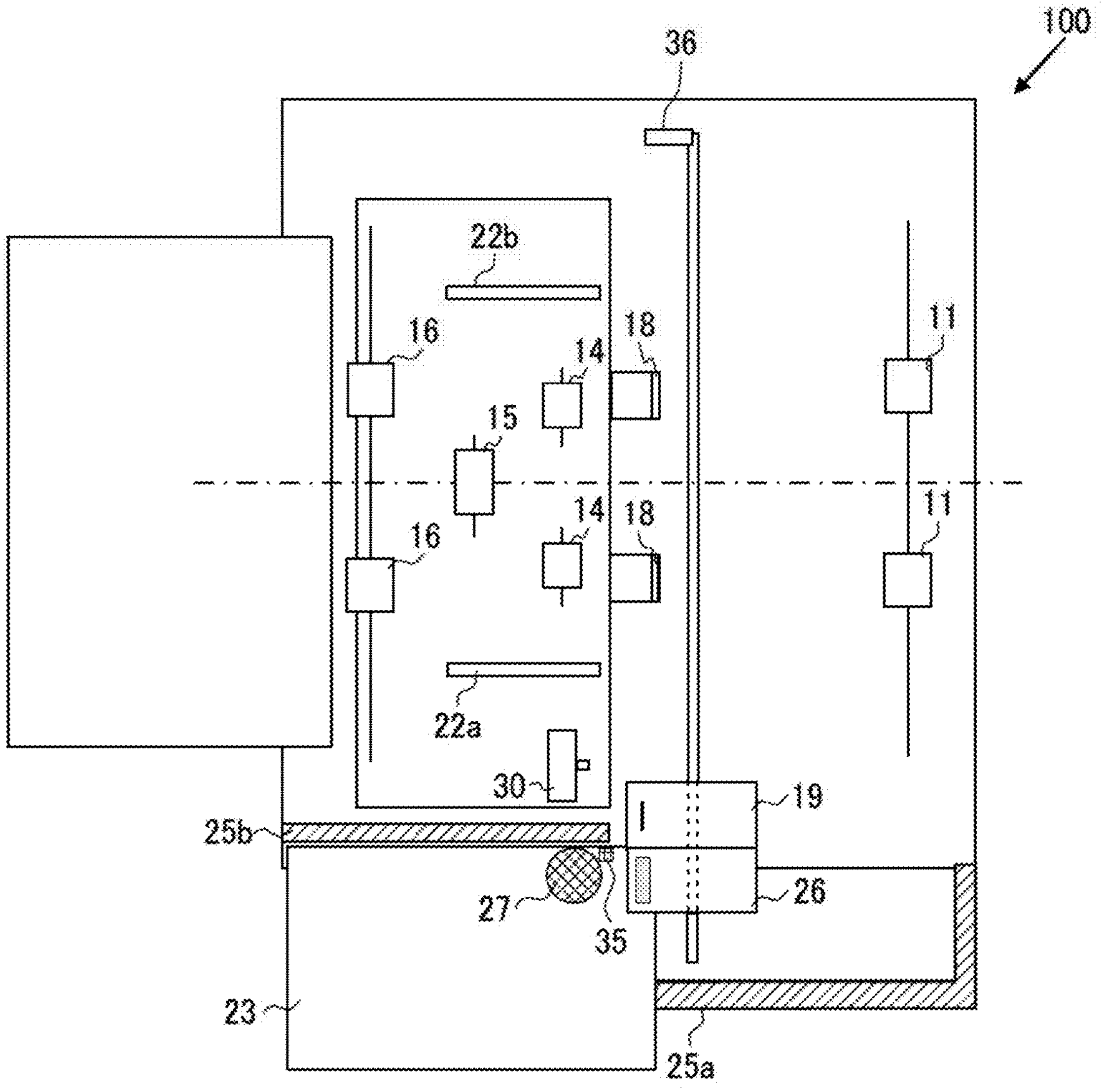
FIG. 14 is a plan view of a binding device when a liquid applier is moved to a manual binding position, according to an embodiment of the present disclosure.

When the number of sheets N is six or greater than six (YES in step S1106) and nineteen or smaller than nineteen (NO in step S1107), in other words, when the number of sheets N is six to nineteen, the liquid applier 26 is moved to the manual binding position (step S1108). FIG. 14 is a plan view of the binding device 100 when the liquid applier 26 is moved to the manual binding position, according to the present embodiment.

Figure 15:
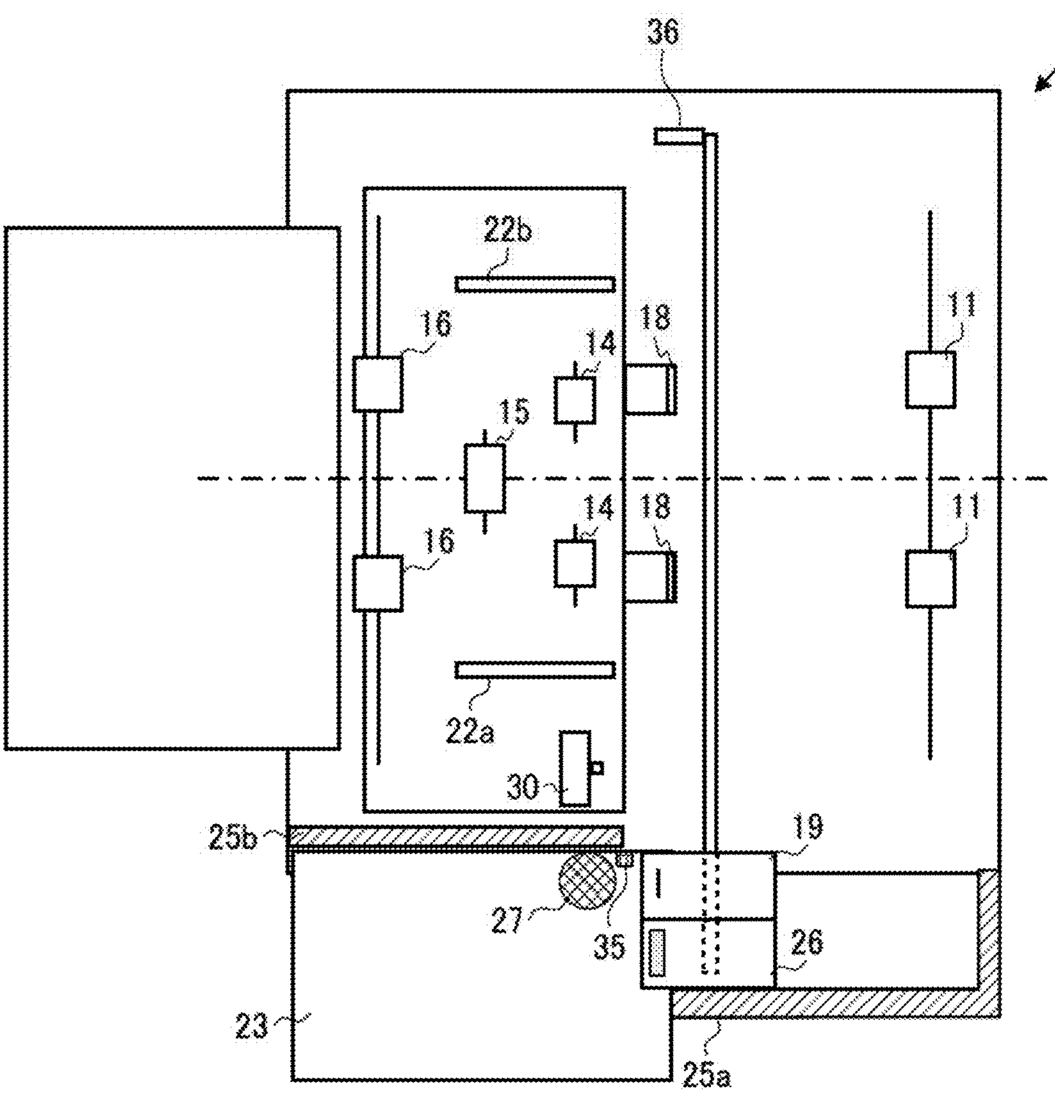
FIG. 15 is a plan view of a binding device when a press binder is moved to the manual binding position, according to an embodiment of the present disclosure.

Next, the liquid applier 26 applies liquid to the sheet bundle Pb (step S1109). Subsequently, the above-described process is looped until a predetermined time elapses for the liquid to permeate the sheet bundle Pb (NO in step S1110). When the time exceeds the predetermined time (YES in step S1110), the press binder 19 is moved to the manual binding position (step S1111). FIG. 15 is a plan view of the binding device 100 when the press binder 19 is moved to the manual binding position, according to the present embodiment.

Subsequently, the press binding is performed (step S1112). When the press binding is finished, the sheet-bundle holder 27 is lifted to release the sheet bundle Pb from being held (step S1115), and the manual binding is finished.

When the number of sheets N is equal to or smaller than five (NO in step S1106), the liquid is not applied to the sheet bundle Pb, and the press binder 19 is moved to the manual binding position to perform the press binding (step S1111). Subsequently, the press binding is performed (step S1112), and when the press binding is finished, the sheet-bundle holder 27 is lifted to release the sheet bundle Pb from being held (step S1115), and the manual binding is finished.

As described above, in the binding device 100 of the present embodiment, the number of sheets P of the sheet bundle Pb is calculated by using the sheet bundle holding operation by the sheet-bundle holder 27, and the press binding or the press binding after liquid application can be performed as appropriate based on the number of sheets P.

Third Embodiment

Figure 16:
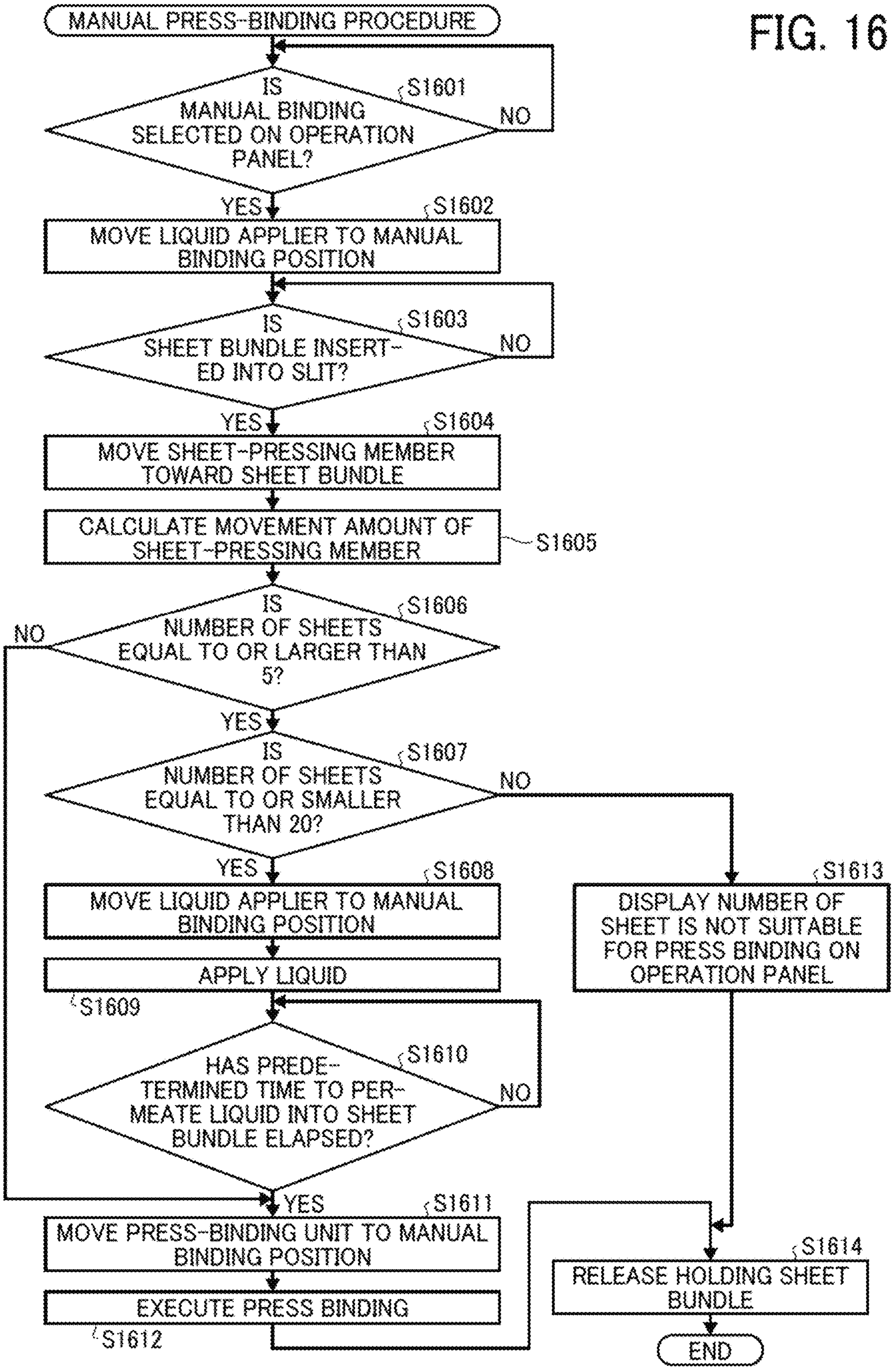
FIG. 16 is a flowchart of a procedure of a manual binding process, according to a third embodiment of the present disclosure.

Next, a description is given of a procedure of the manual binding performed by the binding device 100 according to a third embodiment. FIG. 16 is a flowchart of the procedure of the manual binding performed by the binding device 100 according to the present embodiment. First, prior to determining whether the sheet bundle Pb is inserted into the slit 23, the operation panel 340 (see FIG. 12) is displayed on the operation panel 340.

The above-described process is looped until the start press-binding button 342 is pressed on the operation panel 340 (NO in step S1601). When the start press-binding button 342 is pressed (YES in step S1601), the liquid applier 26 is moved to the manual binding position (step S1602).

Subsequently, the sheet sensor 35 detects whether the sheet bundle Pb is inserted into the slit 23 and reaches a predetermined position (step S1603). The above-described process loops until the sheet bundle Pb is detected in the slit 23 (NO in step S1603). When the sheet bundle Pb is detected in the slit 23 (YES in step S1603), the sheet-pressing motor 30 rotates, and the sheet-bundle holder 27 moves toward the sheet bundle Pb set in the slit 23 and the recess 37 (step S1604).

Then, the CPU 110 calculates the movement length L2 when the sheet-bundle holder 27 is lowered (step S1604) and calculates the number of sheets P by subtracting the movement length L2 from the slit interval L1 (step S1605).

Subsequently, the CPU 110 compares the calculated number of sheets of the sheet P with the threshold values in the processing determination table T400 illustrated in FIG. 13 and branches the process. As illustrated in the process determination table T400 of FIG. 13, "One to five sheets", "Six to nineteen sheets", and "Twenty sheets or more" are set as thresholds of the number of sheets N as the calculated number of sheets P.

When the number of sheets N is equal to or greater than six (YES in step S1606) and is not equal to or smaller than nineteen (NO in step S1607), a message that indicates that the number of sheets is not suitable for the press-binding process is displayed in the notification screen 341 of the operation panel 340 (step S1613). Then, the sheet-bundle holder 27 is lifted to release the sheet bundle Pb from being held (step S1614), and the manual binding is finished.

When the number of sheets N is six or greater than six (YES in step S1606) and nineteen or smaller than nineteen (NO in step S1607), in other words, when the number of sheets N is six to nineteen, the liquid applier 26 is moved to the manual binding position (step S1608). FIG. 14 is a plan view of the binding device 100 when the liquid applier 26 is moved to the manual binding position, according to the present embodiment.

Next, the liquid applier 26 applies liquid to the sheet bundle Pb (step S1609). Subsequently, the above-described process is looped until a predetermined time elapses for the liquid to permeate the sheet bundle Pb (NO in step S1610). When the time exceeds the predetermined time (YES in step S1610), the press binder 19 is moved to the manual binding position (step S1611). FIG. 15 is a plan view of the binding device 100 when the press binder 19 is moved to the manual binding position, according to the present embodiment.

Subsequently, the press binding is performed (step S1612). When the press binding is finished, the sheet-bundle holder 27 is lifted to release the sheet bundle Pb from being held (step S1615), and the manual binding is finished.

When the number of sheets N is equal to or smaller than five (NO in step S1606), the liquid is not applied to the sheet bundle Pb, and the press binder 19 is moved to the manual binding position to perform the press binding (step S1611). Subsequently, the press binding is performed (step S1612), and when the press binding is finished, the sheet-bundle holder 27 is lifted to release the sheet bundle Pb from being held (step S1615), and the manual binding is finished.

As described above, in the binding device 100 of the present embodiment, the number of sheets P of the sheet bundle Pb is calculated by using the sheet bundle holding operation by the sheet-bundle holder 27, and the press binding or the press binding after liquid application can be performed as appropriate based on the number of sheets P.

Fourth Embodiment

Figure 17:
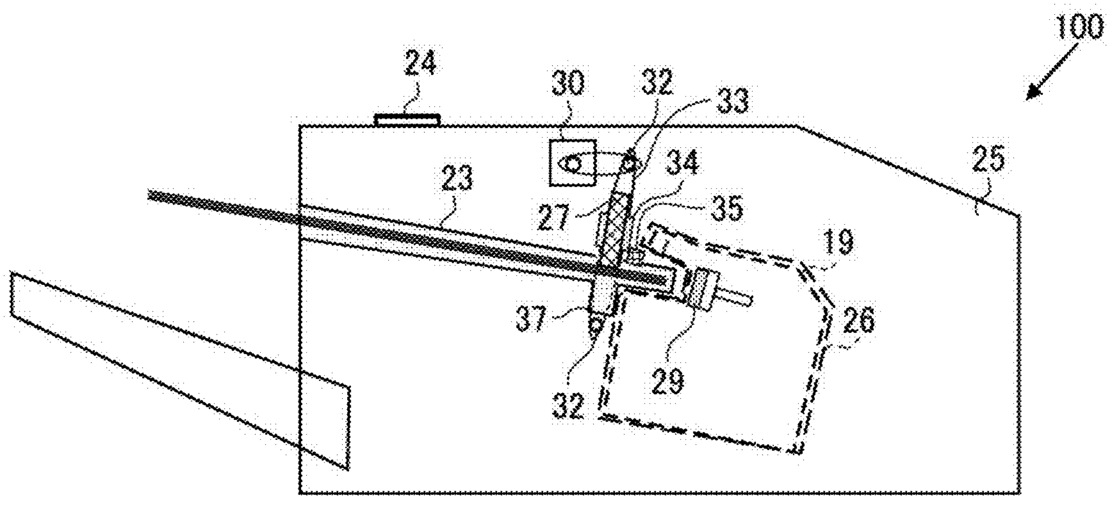
FIG. 17 is a diagram illustrating a binding device according to an embodiment of the present disclosure.

Next, a description is given of the binding device 100 according to a fourth embodiment. As illustrated in FIG. 17, in addition to the liquid applier 26 that applies liquid in the thickness direction of the sheet bundle Pb, the binding device 100 may include a second liquid applier 29.

The second liquid applier 29 does not apply the liquid in the thickness direction of the sheet bundle Pb. However, the second liquid applier 29 applies the liquid from a lateral side of the end of the sheet bundle Pb. Such a configuration as described above can further enhance the binding strength by the liquid application.

Fifth Embodiment

Figure 18:
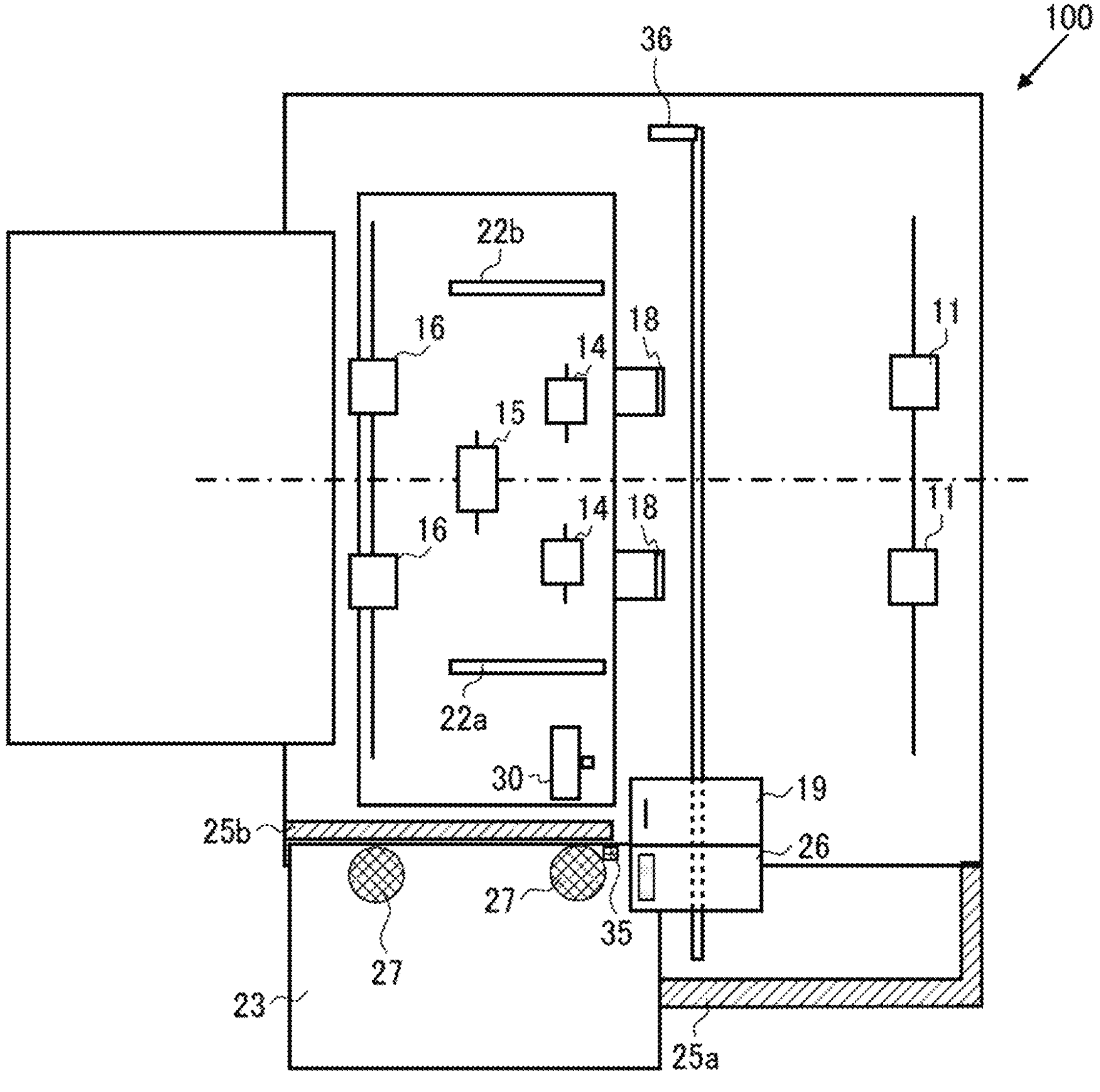
FIG. 18 is a diagram illustrating a binding device according to a fourth embodiment of the present disclosure.

Next, a description is given of the binding device 100 according to a fifth embodiment. As illustrated in FIG. 18, multiple sheet-bundle holders 27*a* may be disposed in the binding device 100. In other words, when the sheet bundle Pb is to be bound by the manual binding, the sheet bundle Pb may be pressed and held at multiple positions until the press binding of the sheet bundle Pb is completed. Thus, the sheet bundle Pb can be held more reliably.

As described above, in the binding device 100 according to the above embodiments of the present disclosure, when the manual binding is performed, the CPU 110 measures the thickness of the sheet bundle Pb by using the sheet-bundle holder 27 to prevent the position of the sheet bundle Pb from being shifted. As a result, the manual binding in which the binding strength is likely to be secured can be performed.

In addition, the CPU 110 can control whether to apply the liquid based on the thickness of the sheet bundle Pb obtained by using the sheet-bundle holder 27. Accordingly, the binding strength and the operability of the binding device 100 can be further enhanced.

The present disclosure is not limited to specific embodiments described above, and numerous additional modifications and variations are possible in light of the teachings within the technical scope of the present disclosure. It is therefore to be understood that the disclosure of the present specification may be practiced otherwise by those skilled in the art than as specifically described herein. Such embodiments and modifications of the present disclosure are included in the scope and gist of the embodiments of the present disclosure and are included in the embodiments described in claims and the equivalent scope of the present disclosure.

Aspects of the present disclosure are, for example, as follows.

First Aspect

A media processing apparatus includes an opening into which a sheet bundle formed by bundling multiple sheet-shaped media is insertable, a sheet-bundle holder to hold the sheet bundle inserted into the opening and detect a thickness of the sheet bundle, a liquid applier to apply liquid to the sheet bundle in accordance with the detected thickness of the sheet bundle, a press binder to perform press-binding process on the sheet bundle inserted into the opening, and a controller to cause the sheet-bundle holder to hold a position of the sheet bundle and determine the thickness of the sheet bundle when the sheet-bundle holder presses a portion of the sheet bundle inserted into the opening in a thickness direction of the sheet bundle.

Second Aspect

The media processing apparatus according to the first aspect further includes an operation device to select whether to perform the press-binding process. The timing at which the sheet-bundle holder starts pressing the sheet bundle is after the press-binding process is selected on the operation device.

Third Aspect

The media processing apparatus according to the first aspect further includes a sheet-bundle detector to detect whether the sheet bundle inserted from the opening is present or absent. The timing at which the sheet-bundle holder starts pressing the sheet bundle is after the sheet bundle is detected by the sheet-bundle detector.

Fourth Aspect

In the media processing apparatus according to any one of the first to third aspects, the sheet-bundle holder changes a pressing time in which the sheet-bundle holder presses the sheet bundle based on the thickness of the sheet bundle.

Fifth Aspect

In the media processing apparatus according to any one of the first to fourth aspect, a portion of the sheet-bundle holder to hold the sheet bundle in the press-binding process has water resistance.

Sixth Aspect

In the media processing apparatus according to any one of the first to fourth aspects, the sheet-bundle holder includes multiple members to press the sheet bundle in the press-binding process.

Seventh Aspect

An image forming apparatus includes a housing, an image forming device disposed in the housing to form an image on a sheet-shaped medium, and the media processing apparatus according to any one of the first to sixth aspects. The media processing apparatus is detachably supported by the housing and performs the press-binding process on the medium on which the image has been formed by the image forming device.

Eighth Aspect

An image forming system includes an image forming apparatus to form an image on a sheet-shaped medium, and the media processing apparatus according to any one of the first to sixth aspects, connected to the image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A media processing apparatus comprising:

a slit insertable a sheet bundle of multiple sheets;

a sheet-bundle holder to:

hold the sheet bundle inserted into the slit; and detect a thickness of the sheet bundle in a thickness direction;

a liquid applier to apply liquid to the sheet bundle;

a press binder to press and bind the sheet bundle inserted into the slit to perform press-binding process;

circuitry configured to:

cause the sheet-bundle holder to hold the sheet bundle inserted into the slit and detect the thickness of the sheet bundle in the thickness direction;

determine whether to cause the liquid applier to apply liquid to the sheet bundle based on the thickness of the sheet bundle detected by the sheet-bundle holder;

cause the liquid applier to apply the liquid to the sheet bundle when it is determined that the thickness of the sheet bundle is equal or larger than a prescribed thickness; and cause the press binder to press and bind the sheet bundle inserted into the slit, and an operation device to receive a selection about whether to perform the press-binding process, wherein the circuitry causes the sheet-bundle holder to start pressing the sheet bundle after a receipt of the selection, about whether to perform the press-binding process, received by the operation device.

2. A media processing apparatus comprising:

a slit insertable a sheet bundle of multiple sheets;

a sheet-bundle holder to:

hold the sheet bundle inserted into the slit; and detect a thickness of the sheet bundle in a thickness direction;

a liquid applier to apply liquid to the sheet bundle;

a press binder to press and bind the sheet bundle inserted into the slit to perform press-binding process;

circuitry configured to:

cause the sheet-bundle holder to hold the sheet bundle inserted into the slit and detect the thickness of the sheet bundle in the thickness direction;

determine whether to cause the liquid applier to apply liquid to the sheet bundle based on the thickness of the sheet bundle detected by the sheet-bundle holder;

cause the liquid applier to apply the liquid to the sheet bundle when it is determined that the thickness of the sheet bundle is equal or larger than a prescribed thickness; and cause the press binder to press and bind the sheet bundle inserted into the slit, and a sheet-bundle detector to detect a presence of the sheet bundle inserted into the slit, wherein the circuitry causes the sheet-bundle holder to start pressing the sheet bundle in response to a detection of the sheet bundle inserted into the slit by the sheet-bundle detector.

3. The media processing apparatus according to claim 1, wherein the circuitry changes a pressing time for pressing the sheet bundle by the sheet-bundle holder based on the thickness of the sheet bundle.

4. The media processing apparatus according to claim 1, wherein the sheet-bundle holder includes a holding portion to hold the sheet bundle in the press-binding process, and the holding portion having water resistance.

5. The media processing apparatus according to claim 1, further comprising multiple sheet-bundle holders including the sheet-bundle holder to perform the press-binding process.

6. An image forming apparatus comprising:

a housing;

the media processing apparatus according to claim 1, detachably attachable to the housing; and an image forming device in the housing to form an image on the multiple sheets, wherein the media processing apparatus presses and binds the sheet bundle of the multiple sheets on which the image has been formed by the image forming apparatus.

7. An image forming system comprising:

the media processing apparatus according to claim 1; and an image forming apparatus to form an image on each of the multiple sheets, wherein the media processing apparatus presses and binds the sheet bundle of the multiple sheets on which the image has been formed by the image forming apparatus.

8. The media processing apparatus according to claim 2, wherein the circuitry changes a pressing time for pressing the sheet bundle by the sheet-bundle holder based on the thickness of the sheet bundle.

9. The media processing apparatus according to claim 2, wherein the sheet-bundle holder includes a holding portion to hold the sheet bundle in the press-binding process, and the holding portion having water resistance.

10. The media processing apparatus according to claim 2, further comprising multiple sheet-bundle holders including the sheet-bundle holder to perform the press-binding process.

11. An image forming apparatus comprising:

a housing;

the media processing apparatus according to claim 2, detachably attachable to the housing; and an image forming device in the housing to form an image on the multiple sheets, wherein the media processing apparatus presses and binds the sheet bundle of the multiple sheets on which the image has been formed by the image forming apparatus.

12. An image forming system comprising:

the media processing apparatus according to claim 2; and an image forming apparatus to form an image on each of the multiple sheets, wherein the media processing apparatus presses and binds the sheet bundle of the multiple sheets on which the image has been formed by the image forming apparatus.

* * * * *